US012695267B2

(12) United States Patent
Kane et al.

(10) Patent No.: US 12,695,267 B2
(45) Date of Patent: Jul. 28, 2026

(54) LASER SYSTEM FOR RANGING APPLICATIONS

(71) Applicants: Thomas James Kane, Menlo Park, CA (US); John Lawrence Nightingale, Portola Valley, CA (US)

(72) Inventors: Thomas James Kane, Menlo Park, CA (US); John Lawrence Nightingale, Portola Valley, CA (US)

( * ) Notice: Subject to any disclaimer, the term of this patent is extended or adjusted under 35 U.S.C. 154(b) by 1092 days.

(21) Appl. No.: 17/739,109

(22) Filed: May 7, 2022

(65) Prior Publication Data

US 2022/0376457 A1 Nov. 24, 2022

Related U.S. Application Data

(60) Provisional application No. 63/186,178, filed on May 10, 2021.

(51) Int. Cl.
  *H01S 3/06* (2006.01)
  *G01S 7/481* (2006.01)
  (Continued)

(52) U.S. Cl.
  CPC ........ *H01S 3/09415* (2013.01); *G01S 7/4814* (2013.01); *G01S 17/10* (2013.01); *H01S 3/0621* (2013.01); *H01S 3/08004* (2013.01); *H01S 3/0912* (2013.01); *H01S 3/1115* (2013.01); *H01S 3/1611* (2013.01); *H01S 3/1673* (2013.01)

(58) Field of Classification Search
  CPC ............... H01S 3/09415; H01S 3/0621; H01S 3/08004; H01S 3/0912; H01S 3/1115;

H01S 3/1611; H01S 3/1673; H01S 3/08031; H01S 3/1062; H01S 3/025; H01S 3/113; H01S 3/139; H01S 3/137; H01S 3/0604; H01S 3/1312; G01S 7/4814; G01S 17/10; G01S 7/484

See application file for complete search history.

(56) References Cited

U.S. PATENT DOCUMENTS 4,953,166 A 8/1990 Mooradian
5,210,764 A 5/1993 Bucher
  (Continued)

FOREIGN PATENT DOCUMENTS

AU 2001292109 3/2006
CN 101030690 9/2007
  (Continued)

OTHER PUBLICATIONS

Malyarevich, A. M., Denisov, I. A., Yumashev, K. V., Mikhailov, V. P., Conroy, R. S., and Sinclair, B. D., "V:YAG—a new passive Q-switch for diode-pumped solid-state lasers," Appl. Phys. B 67, 555-558 (1998).
  (Continued)

*Primary Examiner* — Xinning(Tom) Niu

(57) ABSTRACT

A passively, Q-switched laser operating at an eye safe wavelength of between 1.2 and 1.4 microns is described. The laser may operate at a lasing wavelength of 1.34 microns and use a gain element of $Nd:YVO_4$ and a saturable absorber element of V:YAG. The systems and methods to produce short pulses having a pulse duration less than 1 ns and high energy pulses having pulse energies greater than 2 $\mu J$ are described.

15 Claims, 7 Drawing Sheets

(51) Int. Cl.

| | |
|---|---|
| *G01S 17/10* | (2020.01) |
| *H01S 3/08* | (2023.01) |
| *H01S 3/091* | (2006.01) |
| *H01S 3/0941* | (2006.01) |
| *H01S 3/1115* | (2023.01) |
| *H01S 3/16* | (2006.01) |

(56) References Cited

U.S. PATENT DOCUMENTS

| | | | |
|---|---|---|---|
| 5,394,413 A | 2/1995 | Zayhowski | |
| 5,761,234 A * | 6/1998 | Craig | H01S 5/4031 |
| | | | 372/50.1 |
| 5,771,324 A * | 6/1998 | Hargis | G02B 6/04 |
| | | | 385/11 |
| 5,790,722 A * | 8/1998 | Minden | H01S 3/094003 |
| | | | 385/27 |
| 5,892,586 A | 4/1999 | Thony | |
| 6,023,479 A * | 2/2000 | Thony | H01S 3/113 |
| | | | 372/71 |
| 6,055,815 A | 5/2000 | Peterson | |
| 6,320,889 B1 | 11/2001 | MacKinnon | |
| 6,373,864 B1 | 4/2002 | Georges | |
| 6,400,495 B1 | 6/2002 | Zayhowski | |
| 6,512,630 B1 | 1/2003 | Zayhowski | |
| 6,847,462 B1 | 1/2005 | Kacyra | |
| 7,224,707 B2 | 5/2007 | Gendron | |
| 7,254,148 B2 | 8/2007 | Masuda | |
| 7,648,290 B2 | 1/2010 | Feve | |
| 8,102,893 B2 | 1/2012 | Giaretta | |
| 8,126,023 B2 | 2/2012 | Stiens | |
| 8,446,925 B2 | 5/2013 | Goldberg | |
| 8,811,440 B2 | 8/2014 | Sandstrom | |
| 8,837,535 B2 | 9/2014 | Spiekermann | |
| 8,948,220 B2 | 2/2015 | Spiekermann | |
| 8,976,820 B2 | 3/2015 | Taira | |
| 9,236,703 B2 | 1/2016 | Filgas | |
| 9,515,448 B2 | 12/2016 | Stultz | |
| 9,810,775 B1 | 11/2017 | Welford | |
| 9,989,629 B1 | 6/2018 | LaChapelle | |
| 10,838,047 B2 | 11/2020 | Chong | |
| 11,054,523 B1 | 7/2021 | Buchter | |
| 11,183,809 B2 | 11/2021 | Kamata | |
| 2003/0118060 A1 | 6/2003 | Spuehler | |
| 2006/0056470 A1 * | 3/2006 | Liu | H01S 3/13 |
| | | | 372/38.1 |
| 2006/0076455 A1 | 4/2006 | Ljungberg | |
| 2006/0109883 A1 * | 5/2006 | Lewis | H04N 9/3111 |
| | | | 372/50.12 |
| 2007/0064747 A1 | 3/2007 | Feve | |
| 2007/0217473 A1 | 9/2007 | Abe | |
| 2010/0215063 A1 | 8/2010 | Gao | |
| 2010/0309936 A1 | 12/2010 | Lefort | |
| 2012/0269214 A1 * | 10/2012 | Li | H01S 3/0627 |
| | | | 372/11 |
| 2013/0044778 A1 * | 2/2013 | Gollier | H01S 5/06256 |
| | | | 372/92 |

| | | | |
|---|---|---|---|
| 2014/0086268 A1 * | 3/2014 | Stultz | H01S 3/113 |
| | | | 372/10 |
| 2016/0294144 A1 | 10/2016 | Williams | |
| 2016/0294152 A1 * | 10/2016 | Bhawalkar | H01S 3/2308 |
| 2017/0123052 A1 | 5/2017 | Hinderling | |
| 2018/0188371 A1 | 7/2018 | Bao | |
| 2018/0269646 A1 | 9/2018 | Welford | |
| 2020/0076152 A1 * | 3/2020 | Eichenholz | G02B 26/125 |
| 2020/0412080 A1 | 12/2020 | Kane | |
| 2021/0226415 A1 | 7/2021 | Shalibo | |
| 2021/0351560 A1 | 11/2021 | Buchter | |
| 2022/0006263 A1 | 1/2022 | Hirano | |

FOREIGN PATENT DOCUMENTS

| | | |
|---|---|---|
| EP | 2109921 | 10/2009 |
| WO | 2021106757 | 6/2021 |
| WO | 2022053924 | 3/2022 |

OTHER PUBLICATIONS

Sulc, J., Jelinková, H., Nejezchleb, K. and Škoda, V., "Nd:YAG/V:YAG microchip laser operating at 1338 nm," Laser Phys. Lett. 2, No. 11, 519-524 (2005).

Sulc, J., Novak, J., Jelinková, H., Nejezchleb, K. and Škoda, V., "Nd:YAG/V:YAG microchip laser generating 1 ns long pulses at 1338 nm," Proc. SPIE 7721, Solid State Lasers and Amplifiers IV, and High-Power Lasers, 772112 (2010).

Sulc, J., Koutný, T., Jelinková, H., Nejezchleb, K. and Škoda, V., "Influence of V:YAG saturable absorber orientation on linearly polarized laser Q-switching," Proc. SPIE 7912, Solid State Lasers XX: Technology and Devices, 791222 (2011).

Kane Thomas J., "1.34 µm Nd:YVO4 laser passively Q-switched by V:YAG and optimized for lidar," Proc. SPIE 11259, Solid State Lasers XXIX: Technology and Devices, 1125902 (Feb. 21, 2020).

X. Xu and J. Diels, "Stable single-axial-mode operation of injection-seeded Q-switched Nd:YAG laser by real-time resonance tracking method," in CLEO: 2013, OSA Technical Digest (online) (Optica Publishing Group, 2013), paper CTh41.8.

William J. Mandeville, Kenneth M. Dinndorf, Norman E. Champigny, "Characterization of passively Q-switched microchip lasers for laser radar," Proc. SPIE 2748, Laser Radar Technology and Applications, (Jun. 26, 1996).

Jan Sulc, Helena Jelinkova, Michal Nemec, Karel Nejezchleb, Vaclav Skoda, "V:YAG saturable absorber for flash-lamp and diode-pumped solid state lasers," Proc. SPIE 5460, Solid State Lasers and Amplifiers, (Sep. 1, 2004).

Norman Hodgson and Horst Weber, Single Mode Resonators, chapter 22 in: Laser Resonators and Beam Propagation. Springer Series in Optical Sciences, vol. 108. Springer, New York, NY.

Jari Nikkinen, Ville-Markus Korpijärvi, Iiro Leino, Antti Härkönen, and Mircea Guina, "Frequency-doubled passively Q-switched microchip laser producing 225 ps pulses at 671 nm", Optics Letts. Vol. 41, Issue 22, pp. 5385-5388 (2016).

* cited by examiner

1

LASER SYSTEM FOR RANGING APPLICATIONS

CROSS REFERENCE TO RELATED APPLICATIONS

This application claims priority to U.S. Provisional Patent Application No. 63/186,178, entitled "LASER SYSTEM FOR RANGING APPLICATIONS," filed May 10, 2021 which is incorporated herein in its entirety for all purposes.

FIELD OF THE INVENTION

The present invention relates to methods and systems for a laser ranging system using a laser that operates at wavelengths between 1.2 and 1.4 microns.

BACKGROUND

An important use of lasers is for ranging, that is, determining the distance from the laser to a target object. The most common way to do this is for the laser to emit a light pulse of short duration, and then for a small amount of that light pulse to be collected which has reflected off of the distant target, which is then detected by a detector co-located with the laser. The time of flight, when multiplied by the speed of light, gives the round-trip distance of the light. One half of this is the distance to the target.

Many early laser ranging systems made use of solid-state lasers based on neodymium operating at wavelengths near 1 μm, which is the wavelength at which neodymium lasers have the most gain and are thus easiest to make. Many military systems use a single large pulse and make a single range measurement to a specific target. The 1 μm wavelength is not considered eye-safe, since light is focused by the eye's lens and reaches the sensitive retina in a small, intense spot. The focused light can permanently damage the retina.

Later ranging systems had as a goal the measurement of a multitude of targets. In these systems a single laser beam may be scanned over a region of interest, and the field of view of a detector, which receives the reflected laser signal, may be scanned as well. Many thousands of pulses may be used and a 3-dimensional image of the laser's surroundings, which is often denoted as a point cloud, can be created. For short range applications, approximately 100 meters or less, semiconductor lasers are ideal, since they are inexpensive and easy to pulse in a controlled manner, by controlling the current applied to the semiconductor laser. For longer ranges, Q-switched neodymium lasers have been used, again at wavelengths near 1 μm, or sometimes at half that wavelength, after conversion of the infrared light into the green spectral region in a nonlinear crystal. Q-switched lasers can easily reach peak powers of many hundreds of watts and above, while semiconductor lasers are limited to a few watts, and even then, with an inferior beam quality. These Q-switched lasers have a longer measurement range, typically thousands of feet and beyond. These systems can in some cases be eye-safe, but only if power is kept very low, which severely limits either the range or the rate of data collection. The least expensive Q-switched neodymium lasers at the 1-μm wavelength are lasers passively Q-switched by chromium ions which are doped into a solid host material, most commonly yttrium aluminum garnet (YAG). These Cr:YAG passively Q-switched lasers typically use Nd:YAG as the laser gain material.

As an alternative to lasers operating in the visible and near infrared spectrum, which are focused on the retina, ranging systems have been developed using longer wavelength lasers that are not focused on the retina. These lasers operate at wavelengths absorbed by the eye so that little or no light reaches the retina. Lasers operating at these wavelengths, generally considered wavelengths longer than 1.2 microns, have been termed eye-safe lasers.

Recently, interest in laser ranging has greatly increased due to the advent of autonomous or semi-autonomous vehicles. Autonomous vehicles can create a model of the outside world partly from cameras, but the use of laser ranging greatly enhances the reliability of these models. In order to get a constantly updated 3-D model, a high measurement rate is needed, requiring a laser with up to a million pulses per second. This allows a new view to be formed many times per second, with hundreds of thousands of pixels in the view. For short range, which is most critical for city driving, ranging systems based on semiconductor lasers may be adequate. For longer range, such as is needed for freeway driving, semiconductor lasers currently do not provide adequate peak power for time-of-flight based ranging systems.

Laser ranging systems for freeway driving need a range exceeding 1000 feet. A type of laser system currently used in long range applications is a fiber-based, master oscillator, power amplifier architecture. In this system, a semiconductor laser provides pulses, which are amplified in a glass fiber doped with erbium ions, which is pumped by a second semiconductor laser. The typical operating wavelength is near 1.5 μm. This wavelength cannot reach the retina; it is absorbed in the surface tissue of the eye, before it is focused. This allows the laser intensity incident on the eye without harm to be much higher than if the laser were operating at a visible or near-infrared wavelength, such as 1 micron. A 1.5-micron wavelength laser may be denoted as an eye-safe laser because light at that wavelength is absorbed before reaching the retina; however, it should be appreciated that at very high powers exposure to a laser beam with this wavelength can cause eye damage.

These fiber-based lasers have peak power, average power, beam quality, and pulse duration adequate for vehicle ranging at freeway speed. However, they are expensive and bulky, typically a 4- or 5-inches square package approximately 0.5 inches thick.

In contrast to bulky and expensive fiber-based laser sources, non-fiber-based solid-state lasers pumped by a semiconductor laser can be small and inexpensive. For example, green laser pointers, which is an example of a solid-state lasers pumped by a semiconductor laser, are about the size of a pencil and are relatively inexpensive. A semiconductor pumped, passively Q-switched laser can be used in ranging applications as described in U.S. patent application publication No. 20200412080.

What is needed is a laser which is eye safe and has a peak power, average power, pulse energy, beam quality, and pulse duration adequate for the intended application.

SUMMARY

In an embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A selected lateral dimension of the gain element is no greater than approximately 1.0 mm.

A second end of the resonator formed by a second surface having a partially transmitting optical coating at the lasing wavelength between 1.2 and 1.4 microns. A saturable absorber element is located in the resonator, the saturable absorber being configured to output the pulsed laser beam. The laser system further includes a multiple emitter pump source having a plurality of emitters each configured to emit an associated polarized pump beam that is incident in polarized form on a common pump spot in the gain element. At least a selected one of the emitters in the multiple emitter pump source operates in a wavelength range between 875 nm to 890 nm and is grating-locked to wavelength-narrow and -stabilize the associated pump beam generated by the selected emitter. The pulsed output laser beam has an average power greater than 1 Watt.

In another embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A selected lateral dimension of the gain element is no greater than approximately 1.0 mm. A saturable absorber element is located in the resonator, the saturable absorber being configured to output the pulsed laser beam. A second end of the resonator is formed by a second surface having a partially transmitting optical coating at the lasing wavelength between 1.2 and 1.4 microns. The laser system further includes a pump source. The pump source operates in a wavelength range between 875 nm to 890 nm and is grating-locked to wavelength-narrow and -stabilize a pump beam generated by the pump source.

In yet another embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A saturable absorber element is located in the resonator, the saturable absorber being configured to output the pulsed laser beam. A second end of the resonator is formed by a second surface having a partially transmitting optical coating at the lasing wavelength between 1.2 and 1.4 microns. The laser system further includes a pump source. The pump source operates in a wavelength range between 875 nm to 890 nm and is grating-locked to wavelength-narrow and -stabilize a pump beam generated by the pump source. The pulsed output laser beam has an average power greater than 1 Watt.

In yet another embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A saturable absorber element is located in the resonator, the saturable absorber being configured to output the pulsed laser beam. A second end of the resonator is formed by a second surface having a partially transmitting optical coating at the lasing wavelength between 1.2 and 1.4 microns. The laser system includes a multiple emitter pump source configured to generate a plurality of pump beams that spatially overlap in a common pump spot in the gain element to form a combined pump beam. The combined pump beam occurs only in or adjacent to the gain element and at least a selected one of the emitters in the multiple emitter pump source operates in a wavelength range between 875 nm to 890 nm and is grating-locked to wavelength-narrow and -stabilize an associated pump beam generated by the selected emitter.

In yet another embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A saturable absorber element is located in the resonator, the saturable absorber being configured to output the pulsed laser beam. A second end of the resonator is formed by a second surface having a partially transmitting optical coating at the lasing wavelength between 1.2 and 1.4 microns. The laser system includes a multiple emitter pump source having a plurality of emitters each configured to emit an associated polarized pump beam that is incident in polarized form on a common pump spot in the gain element. At least a selected one of the emitters in the multiple emitter pump source operates in a wavelength range between 875 nm to 890 nm and is grating-locked to wavelength-narrow and -stabilize the associated pump beam generated by the selected emitter.

In yet another embodiment, a laser system configured to output a pulsed laser beam having a wavelength between 1.2 and 1.4 microns is described. The laser system includes a gain element having a first and a second surface, the first surface having a highly reflective coating at the lasing wavelength to form a first end of a resonator. A saturable absorber element is located in the resonator, the saturable absorber being configured to output the pulsed laser beam. A second end of the resonator is formed by a second surface having a partially transmitting optical coating at the lasing wavelength between 1.2 and 1.4 microns. The laser system includes a pump source that operates in a wavelength range between 875 nm to 890 nm and is grating-locked to wavelength-narrow and -stabilize a pump beam generated by the pump source. The laser system further includes a beam splitter arranged to pick off a portion of the pulsed output laser beam. A length of the laser system is less than 25 mm.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to methods and systems for a laser ranging system using an eye-safe laser. The laser operates at wavelengths between 1.2 and 1.4 microns. The laser can be described as a diode-pumped neodymium laser, operating at a wavelength in the range from 1.2 $\mu$m to 1.4 $\mu$m. The laser may be a passively Q-switched laser, which is caused to have a pulsed output by inclusion of a saturable absorber material within the laser cavity. The saturable absorber may be based on vanadium ions in a crystalline or glass host material. Many design approaches, which optimize this type of laser for ranging, are described below. Laser output power may be increased by use of a second gain element within the laser cavity or external to the laser cavity where it amplifies the output power of the laser cavity. An output power of a laser system may be increased by having a plurality of lasers pumped by a monolithic semiconductor die.

Figure 1:
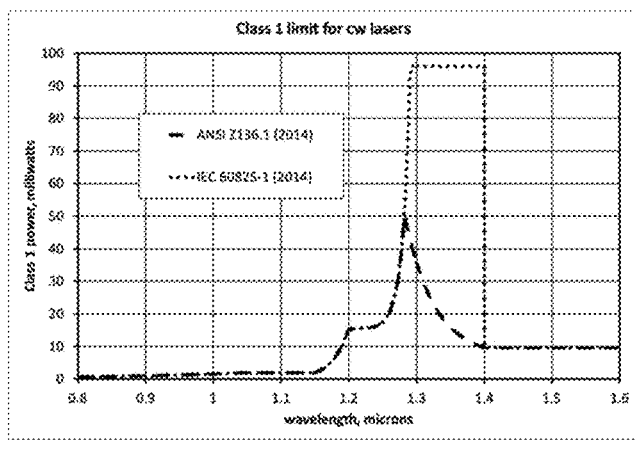
FIG. 1 is a plot of the allowable average power vs. wavelength for a Class 1 (eye-safe) laser.

For operation in an open uncontrolled environment, it is important that a laser ranging system be eye safe. Eye safety exists when an observer who is looking in the direction of the laser source of the laser ranging system will experience no eye damage as a result of exposure to the laser radiation. An eye safe level of laser power varies with the laser wavelength. Various standards have been established for what constitutes an eye safe laser. FIG. 1 plots the allowable laser power limit for an eye safe, class 1, laser as a function of laser wavelength. There are two standards plotted, the IEC and the ANSI standard. They generally overlap but differ somewhat in the wavelength range between 1.28 $\mu$m and 1.4 $\mu$m. Both standards indicate that the wavelength range having the highest allowable eye safe power level is between 1.2 and 1.4 microns. The highest allowable power corresponds to wavelengths near 1.3 microns. For this wavelength, the IEC standard allows continuous-wave laser powers as high as 95 mW and the ANSI standard allows laser powers as high as approximately 40 mW. The values of FIG. 1 apply to a beam which is a near-ideal ray of light. For beams which are spread out, or quickly scanned, as is the case for ranging systems, higher levels of power are considered to be safe, but still the 1.2-1.4 $\mu$m range permits the most power.

Figure 2:
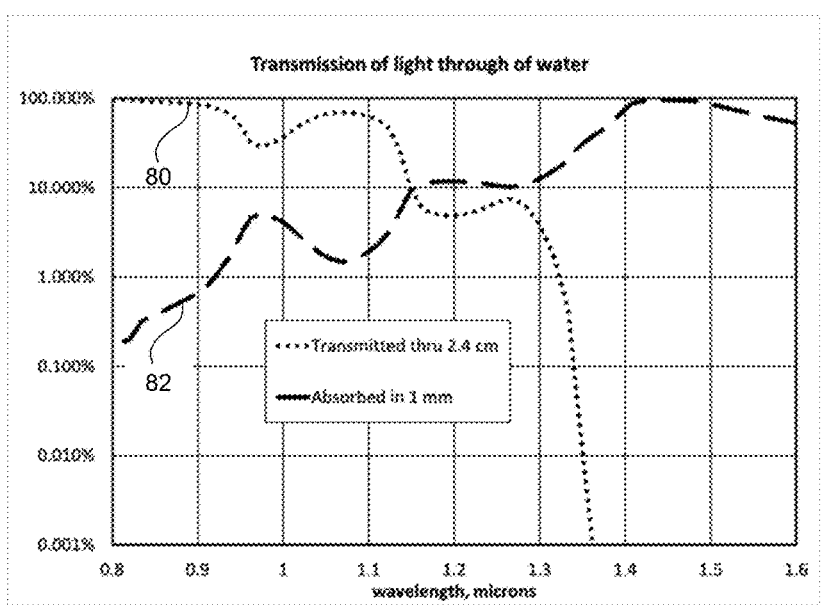
FIG. 2 is a plot of water transmission and absorption vs. wavelength.

The physical basis for the laser safety standards depicted in FIG. 1 is the threshold for damaging the retina or other eye tissue of an observer looking directly at an incoming laser beam. For many wavelengths, such as visible wavelengths, eye tissue is transparent, and incoming light is transmitted to and focused on the retina. As a result, very low optical power levels can burn a spot on the retina resulting in permanent eye damage. Referring back to FIG. 1, the allowable limit for an eye safe power begins to rise significantly for laser wavelengths longer than approximately 1.15 microns. This is a result of absorption of these wavelengths in the eye tissue between the eye's outer surface and the retina. This absorption is dominated by water absorption in the eye tissue. FIG. 2 illustrates water absorption as a function of wavelength.

FIG. 2 shows a curve 80 that plots a fraction of light which is transmitted through a 2.4-cm thick object made of water. The human eye is well modeled by such an object. Humans of all ages have the same size eyes; there is essentially no eye growth after birth. Note that at the deep red wavelength of 0.7 $\mu$m essentially all of the light is transmitted. At 1.2 $\mu$m it is down to 5%. At 1.4 $\mu$m it is essentially 0%, and no light reaches the retina.

FIG. 2 also shows in curve 82 a fraction of light absorbed in the first 1 mm of an object made of water. For wavelengths above 1.4 $\mu$m, essentially all of the light is absorbed in this first millimeter.

The advantage of the wavelength range from 1.2 $\mu$m to 1.4 $\mu$m is that while little of the light passes through 2.4 cm of water and reaches the retina, the light absorption is also not concentrated in the first millimeter. These wavelengths are safer for both the retina and for the eye's outer surface, because light absorption is distributed over the bulk of the eye.

Figure 3:
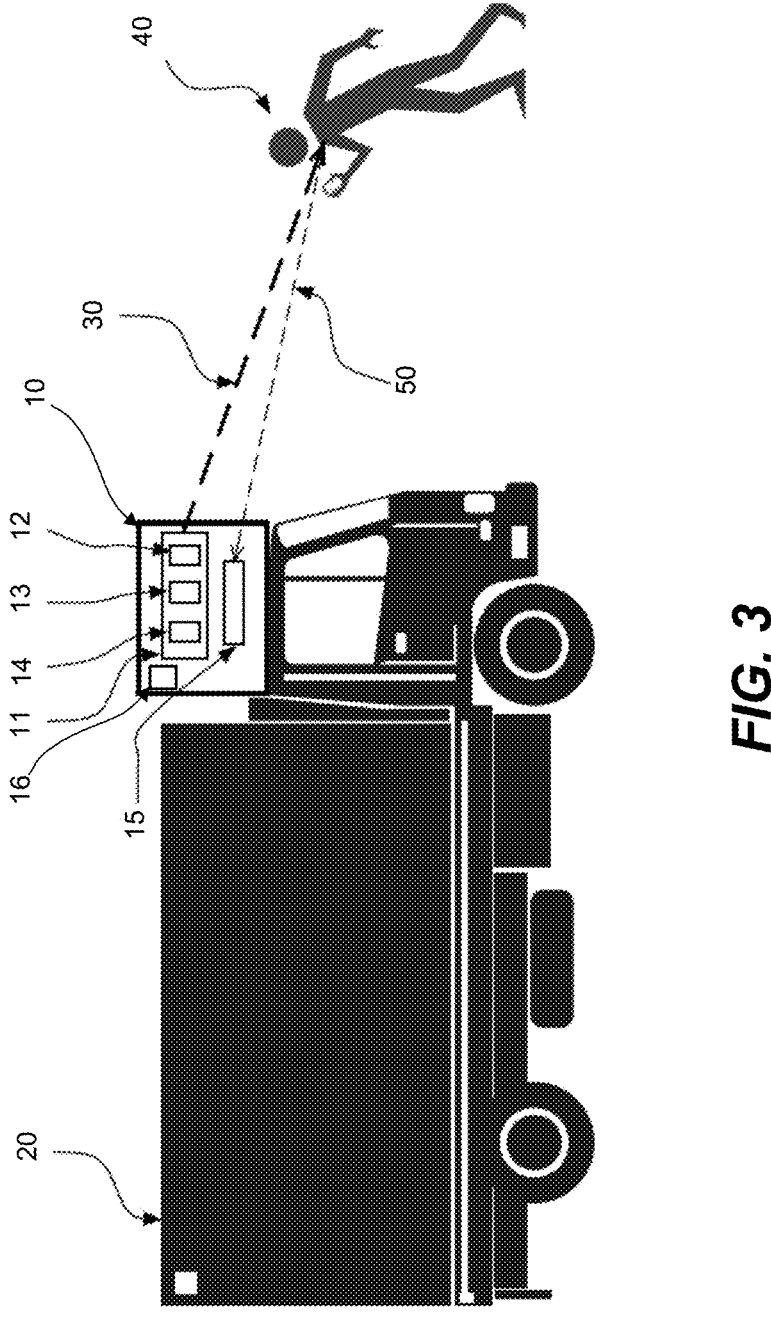
FIG. 3 is a schematic diagram of an exemplary laser ranging system using an eye-safe laser.

FIG. 3 shows a representative laser ranging system according to an embodiment of the present invention. The ranging system 10 may be mounted on a platform, such as a vehicle 20. The vehicle may be under human control or may be autonomous or semi-autonomous. The vehicle 20 and ranging system 10 may operate in an open environment, from which wildlife and humans are not excluded, such as a roadway. The vehicle 20, such as a truck or automobile operating at freeway speeds, needs to get useful range data at distances exceeding 1000 feet. If the vehicle is traveling at 70 mph, the time to travel 1000 feet is less than 10 seconds. The ranging system 10 includes a laser 11. The laser 11 includes a gain element 13 which has as its active dopant neodymium ions or some other ion capable of lasing in a wavelength window between approximately 1.2 and 1.4 microns. Power to pump the gain element 13 may be provided by a semiconductor laser 14. The semiconductor laser may operate in a continuous manner or the pump power delivered to the gain element 13 may be varied as desired. The laser 11 emits an output beam 30 in the wavelength range from 1.2 $\mu$m to 1.4 $\mu$m. Since pump energy may be stored in the gain element 13 the peak power of the output beam 30 can be many times greater than the maximum pump power.

A monitor 12 senses emission of a laser pulse and provides a signal indicative of its emission. The target 40 to be measured by the ranging system 10 may include humans with unprotected eyes. Light beam 30 emitted by the laser 11 may strike the target 40 and be scattered and reflected. Some of the scattered and reflected light 50 returns to a detector 15, which may be co-located with the laser 11 within the ranging system 10. The reflected light may return along an optical path identical or close to that of the laser beam 30. The detector 15 senses the scattered and reflected light and provides a signal. In some embodiments, the monitor 12 and the detector 15 may be a common element.

A determination of the difference in time between an emitted laser pulse and detection of the scattered and reflected light from the target may be made by a processor 16 using the signals from the monitor 12 and detector 15. The time difference is then used to determine the distance to the target using the known speed of light. The output beam 30 may be scanned by a scanning system over a field of view so that a distance between multiple targets in the field of view may be determined. The scanning system may be integrated into the ranging system 10. There may be multiple targets in the field view and the processor 16 may be configured to discern the nature of the different targets in the field of view. Alternatively, the output beam 30 may flood illuminate a large area and spatial resolution is obtained by having multiple detectors that measure the reflected light over different portions of the illuminated area. In other embodiment, the output beam 30 may be arranged as a line source which is scanned in a direction perpendicular to the line of illumination.

The laser ranging system 10 can determine motion of detected targets in its field of view by determining a distance to the target on successive scans. The difference in the target's distance between successive scans, a time between successive scans, and motion of the vehicle 20 are known quantities and can be used to determine target motion.

It should be also appreciated that any of the methods or operations described herein may be stored in a suitable computer readable medium in the form of executable computer code. The executable computer code can be stored in a memory that can include a non-transitory computer-readable medium on which instructions for performing all the methods and functions disclosed can be stored. The term "non-transitory computer-readable medium" can include a single medium or multiple media that store instructions and can include any mechanism that stores information in a form readable by a computer, such as read-only memory (ROM), random-access memory (RAM), erasable programmable memory (EPROM and EEPROM), or flash memory.

The operations are carried out when the processor 16 executes the computer code. The processor 16 may determine a distance between a platform and a target. The processor 16 may cause a passively Q-switched laser mounted on the platform to be operated in a series of pulses, each pulse in the series of pulses having a wavelength between 1.2 and 1.4 microns.

Aside from the basic functionality of determining a time difference, the processor 16 may have other control functions, such as directing scanning of the output laser beam across a field of view. The processor 16 may also include logic that can discriminate between reflected signals from the target and background noise that may be present in the environment. For example, other laser ranging systems may be in the vicinity and may be emitting laser beams at substantially the same wavelength. The processor 16 may be configured to identify these background signals and disregard them. The processor 16 may also direct the laser 11 to operate with different time intervals between the pulses in the series of pulses. Varying the laser output 11 in a controlled manner may form a code that helps to discriminate against background noise. Different methods of changing the laser output parameters are described herein. These methods may include controlling the laser axial mode structure, changing the laser cavity length, adjusting the pump power on the gain element, and amplifying the output power of the laser.

Figure 4:
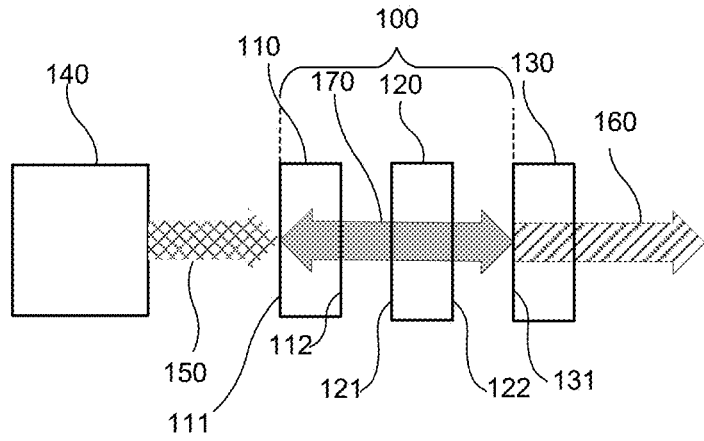
FIG. 4 is a schematic diagram of a prior art 1.3 micron, passively Q-switched laser.

FIG. 4 is a schematic diagram of a prior art laser resonator 100. A gain element 110 is a piece of Nd:YVO$_4$ crystal. Optical coatings are applied to the two large surfaces of the gain element 110. A first surface 111, which forms one end of the laser resonator, is coated for high transmission at a pump wavelength of approximately 0.81 μm, and for high reflection at a lasing wavelength of approximately 1.34 μm. A second surface 112, opposing the first surface 111, is coated for high transmission at 1.34 μm.

The laser resonator 100 contains a saturable absorber, which allows the laser resonator 100 to be passively Q-switched. Passive Q-switching causes the laser resonator output to be a series of pulses rather than a continuous output. The pulses are generated by the laser resonator without any active control element, such as an acousto-optic or electro-optic modulator. The saturable absorber 120 in the laser resonator 100 is a thin piece of the crystalline material vanadium-doped YAG, or V:YAG. Both surfaces 121 and 122 of the V:YAG are coated for high transmission at 1.34 μm. A discrete output coupler 130 has an output coating 131 on its inner surface that forms one of the ends of the laser resonator 100. The output coating 131 reflects most of the resonant light 170 at the 1.34 μm lasing wavelength and couples out a portion to form the output beam 160. The resonant light 170 circulates between the first surface 111 of the gain element 110 and the output coating 131. The output coating 131 may have a low reflectivity at 1.06 microns, so that the resonator 202 does not lase at this wavelength, which has higher gain than the lasing transition at 1.34 microns.

The laser resonator 100 is energized by pump light 150 emitted by a pump laser 140. Typical efficiencies of energy conversion to output pulsed light 160 are up to 30%.

While the prior art laser depicted in FIG. 4 has been demonstrated, various modifications, improvements, and additions to the basic laser may be made that may enable higher performance ranging systems. Some of these modifications, improvements, and additions for pulsed operation have been described in U.S. patent application publication No. 20200412080. Additional modifications and improvements are described below.

Short Pulse Laser System

Figure 5:
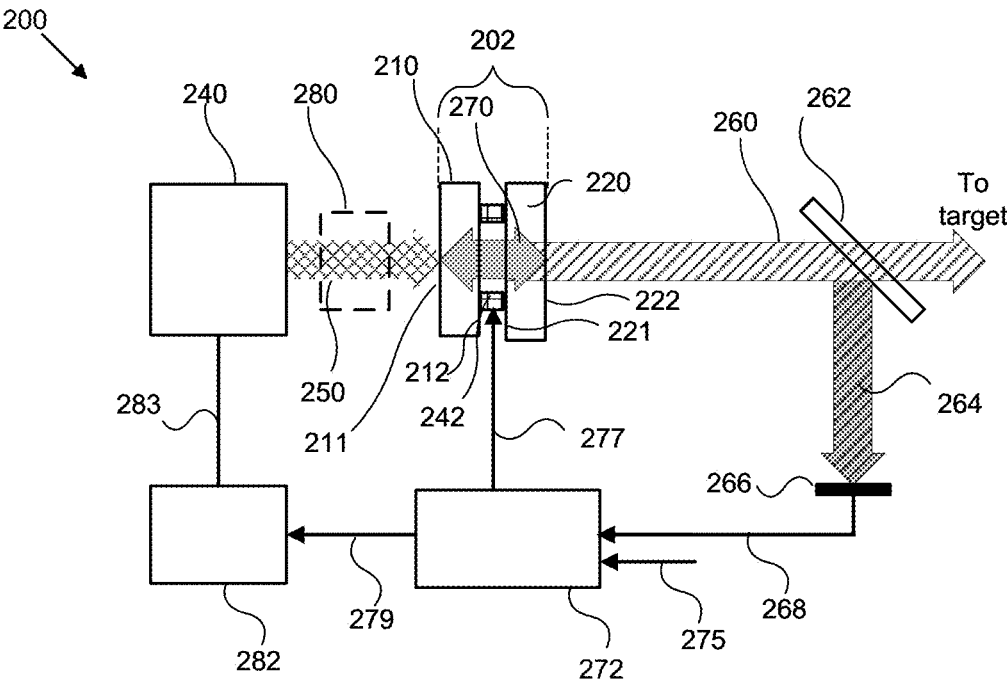
FIG. 5 is a schematic diagram of an eye-safe, passively Q-switched laser system capable of producing very short pulses according to an embodiment of the current invention.

As disclosed in U.S. U.S. patent application publication No. 20200412080 an eye-safe, passively q-switched laser may be used in a ranging system. The pulse length of the laser system described in that application may be decreased by decreasing the cavity length. One design improvement that may be useful in high resolution LIDAR is to shorten the laser output pulse length to pulse durations of less than 1 ns. A short pulse may be obtained by making the laser resonator very short. FIG. 5 is a schematic diagram of a laser system 200 having a very short resonator 202. A gain element 210 may be a piece of Nd:YVO$_4$ crystal. Optical coatings may be applied to the two large surfaces of the gain element 210. A first surface 211, which forms one end of the laser resonator 202, is coated for high transmission at a pump wavelength and for high reflection at a lasing wavelength of approximately 1.34 μm. A second surface 212, opposing the first surface 211, is coated for high transmission at the laser wavelength of 1.34 μm.

The laser resonator 202 may be formed between the first surface 211 of the gain element 210 and a second surface 222 of a saturable absorber element 220. The second surface 222 of the saturable absorber element 220 may be coated to reflect some of the lasing wavelength back into the resonator 202 and transmit some of the resonant light 270 in the laser resonator 202 as an output laser beam 260. That is the coating on the second surface 222 serves as an output coupler that reflects most of the resonant light 270 at the lasing wavelength and couples out a portion to form the output beam 260. A first surface 221 of the saturable absorber element 220 may be coated for high transmission at the lasing wavelength. The first surface 211 of the gain element 210 and the output coupler 222 may either or both have a low reflectivity at 1.06 microns, so that the resonator 202 does not lase at this wavelength, which has higher gain than the lasing transition at 1.34 microns.

The first surface 211 of the gain element 210 and the second surface 222 of the saturable absorber element 220 define the ends of the resonator 202. If first surface 211 and second surface 22 are planar surfaces, the resonator 202 is simple and may be less expensive to produce and build. An advantage of an all-planar resonator is that the requirement for positioning the pump beam within the resonator is greatly relaxed. For an all-planar resonator, the pump can be positioned anywhere on the pumped face, which may be a few millimeters in size; for a resonator with a curved reflecting surface it cannot. A typical tolerance on pump positioning for a resonator with curved optics is a few 10's of microns. In some embodiments either or both first surface 211 and second surface 222 may be deliberately curved.

A spacer 242 may be situated between the gain element 210 and the saturable absorber element 220. The spacer 242 may be a plate with a hole, a tube, or any structure mechanically situated between and connecting the gain element 210 with the saturable absorber element 220. The spacer 242 may have features that allow it to bend such that the alignment of the first surface 211 of the gain element 210 with the second surface 222 of the saturable absorber element 220 may be adjusted so as to change their alignment. The spacer 242 need not enclose the beam path in the resonator 202 although this may be advantageous, since the spacer 242 may then also serve to seal the laser resonator volume from outside contamination that may degrade laser performance. The resonator volume may be completely sealed, such that it is isolated from the surrounding atmosphere, or it may have a seal that allows pressure equalization between the resonator volume and surrounding atmosphere. The spacer 242 may include an aperture or one or more edges to assist in transverse mode control.

The laser resonator 202 may be energized by a pump beam 250 emitted by a pump source 240. Optional optical element 280 may adjust a spot size of the pump beam on the gain element 210. The optional optical element 280 may include an optical fiber, which allows the pump source 240 to be situated remotely from the laser resonator 202. The pump source 240 may be a single emitter, semiconductor laser diode.

Assuming the first surface 211 of the gain element 210 and the second surface 222 of the saturable absorber element 220 are properly aligned, the resonator 202 can lase with the application of sufficient power in the pump laser beam 250. Lasing is established by resonant light 270 circulating between the first surface 211 of the gain element 210 and the second surface 222 of the saturable element 220. The gain element 210 and saturable absorber element 220 must be aligned so that the resonant light 270 reflects off of the two end mirror coatings and returns to the same point. This will be possible if all surfaces are parallel, or by aligning one or both of the reflecting faces to achieve the desired condition of a ray reflecting back on itself indefinitely.

A portion of the output beam 260 may be picked off by a beam splitter 262 forming monitor beam 264. The portion of the output beam not picked off by the beam splitter 262 may be directed to the target. The monitor beam 264 may be directed to a monitor detector 266. The monitor detector 266 may generate an electrical signal 268 representative of the power in the monitor beam 264 incident on the monitor detector 266.

The electrical signal 268 may be directed to a controller 272. The controller 272 may receive one or more control signals 275 from the processer 16 shown in FIG. 3. The controller 272 may output a cavity control signal 277 that causes the spacer 242 to vary in length, thus controlling a length of the resonator 202. The controller 272 may also output a pump control signal 279 to pump laser driver 282. The pump control signal 279 may control current 283 provided by the pump laser driver 240 to the pump source 240. Increasing a voltage of the control signal 279 may proportionally increase the current 283 provided to the pump source 240, increasing the power of the pump laser beam 250. The pump laser driver 240 may be arranged to drive the emitters of the multiple emitter pump source in series such that current flowing through each emitter of the multiple emitter pump source is the same. Alternatively, the pump laser driver 230 may be arranged to drive the emitters of the multiple emitter pump source independently so that a current through each emitter and a power of the pump beam associated with each emitter may be independently controlled.

It should be appreciated that the arrangement and configuration of the various optical and electrical components may be rearranged or integrated together while maintaining the functionality of the laser system 200 depicted in FIG. 5. For example, the beams reflected and passing through the beam splitter 262 may be directed to different destinations. The controller 272 may be integrated with the pump laser driver 282.

The laser resonator 202 has an associated axial, or equivalently a longitudinal, mode spectrum. The spectrum is a series of peaks with intervening valleys as a function of wavelength or frequency. The peaks in the spectrum correspond to the condition that an optical wave making a round trip transit through the laser resonator will have the same phase as its initial phase. This condition is equivalent to a round trip optical path length through the laser resonator 202 being an integer number of wavelengths long. The gain element 210 will have a gain curve with a gain peak. The shape and location of the gain curve and gain peak is determined by the lasing dopant, the host material, and dopant/host material temperature.

By making the resonator 202 very short, for example, less than 1000, 750, 500 or 250 microns in length the cavity round trip time may be reduced, which reduces the duration of output pulses from the laser resonator 202. The full width at one half maximum (FWHM) duration of the laser pulses may be less than 1000, 750, 500, 250, or 100 ps. The pulse rise time may be less than 500, 375, 250, 125, or 50 ps. Here pulse rise time is the time for the output power to increase from 10% of its peak power to 90% of its peak power. Such short pulses are advantageous in precision ranging systems. The speed of light is approximately 30 cm per nanosecond, so for lasers having rise times of one ns or greater, resolution of a ranging system is in the range of 10 cm. For the shorter pulse, faster rise times of laser system 200, the ranging system resolution may be less than 1 cm.

Figure 6:
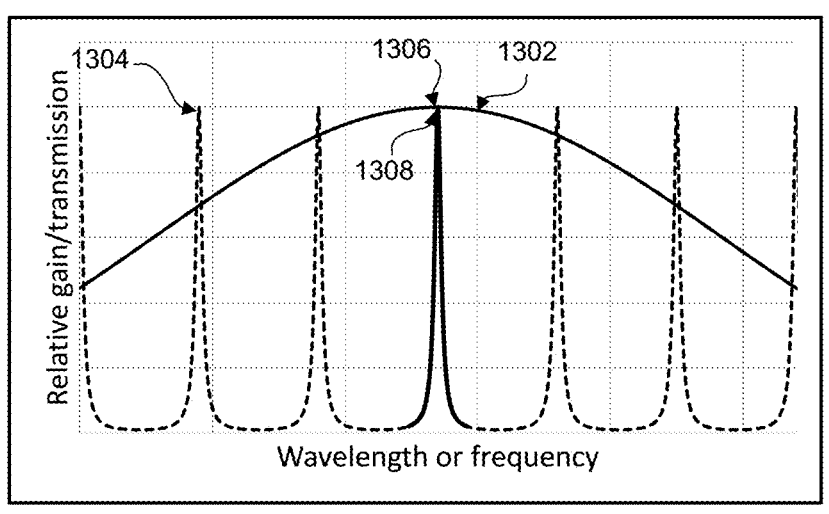
FIG. 6 is a diagram showing alignment of an axial mode spectrum and gain spectrum.

FIG. 6 schematically depicts a resonator axial mode spectrum 1304 and a gain curve 1302. In this case a peak 1306 in the laser gain curve is in alignment with a peak 1308 in the resonator axial mode spectrum 1304. In general, a laser will lase at a wavelength corresponding to one or more of the axial mode peaks 1308. In various embodiments described below the relative position of the axial mode peaks 1308 may be shifted relative to the gain peak 1306 to obtain a desired axial mode alignment. In particular, the resonator axial mode spectrum 1304 may be shifted so that the peak 1308 is aligned or substantially aligned with the gain peak 1306 in the gain curve 1304. Operation in this manner facilitates single axial mode operation.

The position of the axial mode spectrum may be shifted by changing the physical length of the resonator or changing the optical path length in the gain element 210 or saturable absorber element 220. A change in resonator length of ¼ wavelength, which is 0.33 µm for a wavelength of 1.34 µm, is enough to move the laser from the condition of one, centered mode, to two modes straddling the gain curve, with equal gain. Such a change in resonator length may be readily achieved by fabricating the spacer 242 from a piezoelectric material that changes its length with applied voltage.

To align a peak in the axial mode spectrum 1308 with the peak of the gain 1306 a control signal 277 may be applied to the spacer 242. The control signal 277 may cause the spacer length to change by more than a quarter of the lasing wavelength, causing at least one axial mode peak 1308 to be aligned with the gain peak 1306 during the scan. The power of the output beam 260 and amplitude stability of the output beam 260 may be monitored by the monitor detector 266 during the scan. A control signal 277 that results in high output power, good amplitude stability, and low timing jitter between successive laser pulses corresponds to alignment of an axial mode spectrum peak 1308 with the gain curve peak 1306. Once a scan has been completed, the controller 272 can apply a steady control signal 277, which may be denoted as VDC, that places the resonator 202 is this aligned condition or in any condition of alignment between the gain curve 1302 and the axial mode spectrum 1304 as desired.

Single frequency operation is enhanced by making the laser cavity length as small as possible, such as cavity lengths less than 1 mm. A short laser cavity increases the spacing between adjacent axial modes, which increases the differences in gain between adjacent modes. While using a short laser cavity is helpful in maintaining single axial mode operation, it may be detrimental to maintaining single transverse mode operation. A laser with a "single transverse mode" is a laser with a single, stable wavefront whose shape approximates a sphere or an ellipsoid. This stability leads to a high-quality beam. The beam from a single-transverse-mode laser has near-ideal beam properties. Such a beam has an M-squared ($M^2$) value in the rage 1 to 2 in each of two orthogonal directions perpendicular to a propagation direction. It can be focused to a smaller spot than a beam from a multi-transverse-mode laser.

Single transverse mode operation of the resonator 202 may be improved by using a small diameter pump spot. Multi transverse mode pump lasers cannot maintain a small pump spot over the thickness of the gain element 210, since if pump beam 250 is focused tightly to create a small focal spot in the gain element 210, the pump beam 250 rapidly diverges rapidly expanding the pump spot size.

By contrast a single transverse mode pump source may be used to pump the resonator 202. With single transverse mode pumping, the pump beam 250 diameter in the gain element 210 may be less than 50, 25, or 10 microns over the entire length of the gain element 210. For clarity, the pump beam diameter herein will refer to a diameter of a circular area that encircles 90% of the beam power in the gain element 210. In other words, using a single-transverse-mode laser as the pump source 240 enables the transverse dimensions of a volume containing the laser gain of the pumped laser to be made smaller. That is a pumped diameter in the gain element

210 is smaller. As the pumped diameter get smaller the resonator 202 can be made shorter while maintaining single-transverse-mode operation of the resonant light 270. The resultant output beam 260 thus is single transverse mode. A single transverse mode pump source can be either butt coupled or tightly focused into the gain element 210 in the laser resonator 202 to obtain a small diameter pump spot. The pump spot diameter may be less than 10 or 20 microns, compared to the 50-to-100-micron pump spot diameters that are typical when using a multi-transverse mode pump source, such as a 100-micron aperture edge-emitting laser diode or a similarly sized VCSEL (vertical cavity surface emitting laser) pump source. The single transverse mode pump source may be either an edge-emitting laser diode with a small aperture or a small aperture VCSEL. Here the term single axial mode means that substantially all of the power, such as more than 80%, 90%, 95%, or 99% of the power, in a laser beam is in one axial mode. Here the term single transverse mode means that a beam can be characterized as having a $M^2$ value in each of two orthogonal directions perpendicular to a propagation direction of less than or equal to 1.5.

One way to make a laser operate in a single axial mode is to force all or most of the gain into a region within a few hundred microns of the end of the laser resonator 202. For the resonator depicted in FIG. 5, this places the gain predominantly near the first surface 211 of the gain element 210. When this is done, adjacent modes are suppressed, since the standing wave pattern of each mode is heavily overlapped in the gain region. To achieve this condition of strong absorption of pump light for the gain element 210 formed from a Nd:YVO$_4$ crystal, the doping should be high, typically 2% or higher; the pump light should be linearly polarized parallel to the "c" axis of the Nd:YVO$_4$ and the pump wavelength should be near a peak of the Nd:YVO$_4$ absorption.

Absorption peaks in the Nd:YVO$_4$ crystal spectrum occur in several wavelength ranges. Two wavelength ranges that are attractive for pumping are a first range near 808 nm and a second range between 875 and 890 nm. The second wavelength range has relatively narrow absorption peaks at wavelengths of 878.6, 879.5, 885, and 888 nm. An attractive feature of the 808 nm pump wavelength is that the absorption feature is approximately 5 nm wide, allowing efficient pumping with spectrally broader pump sources and looser control on the pumping wavelength. The second, longer wavelength range has the advantage of having a smaller quantum defect between the pump beam 250 and output beam 260. The resonator 202 may be pumped with a pump source in one of these wavelength ranges or it may be simultaneously pumped with a plurality of pump sources having different wavelengths that may be either in the same or a different wavelength range. To lock and narrow the pump wavelength a grating-stabilized pump laser may be used. In other words, the pump source may be grating-locked to wavelength-narrow and -stabilize the associated pump beam generated by pump source. The grating may be either internal to the pump laser or may be positioned external to the pump laser cavity and be part of the optics 280.

The smaller quantum defect of the second wavelength range has the advantage that the ratio of heat to useful power is smaller. This reduction in heat for a given level of laser output may allow higher power and higher pulse energy, since Nd:YVO$_4$ lasers are commonly limited by heating. Heat-limited operation is indicated by "rollover" of the output power of the laser. "Rollover" is said to occur when the application of additional input pump power leads to diminished returns in laser output, or even negative returns, where output power reaches a maximum and increased pump power reduces output power. Pumping in the second wavelength range should raise the power at which rollover occurs relative to pumping in the first wavelength range. Generally pumping in the second wavelength range reduces thermal lensing and may allow a higher output power and more efficient laser system.

The second advantage of pumping in the second wavelength range is that the semiconductor lasers available in this wavelength range may be both more powerful and have greater reliability. This is due to the fact that semiconductor lasers at these wavelengths can be produced with less, or no, aluminum content in the active lasing structure. The presence of aluminum in a semiconductor laser results in known degradation mechanisms that can limit their output power and lifetime.

One element to optimize is the gain element 210, which may be a YVO$_4$ crystal doped with neodymium. The crystal thickness along the pump beam propagation direction and doping level must be properly selected to ensure adequate absorption of the pump beam. A typical thickness may be less than or equal to 1 millimeter or some smaller value such as approximately 0.5 mm, 0.4 mm, 0.3 mm, 0.2 mm or 0.1 mm. A doping level of the Nd ions in the crystal may be higher than is used for larger lasers, which are typically less than 1%; however, doping levels of approximately 1% may be appropriate in some cases. Doping levels of 2% or 3% may be appropriate for the gain element in other cases. A unique "c" crystallographic axis of the YVO$_4$ crystal may be oriented so that it may be substantially in the plane of the first surface 211 and second surface 212, which may be substantially parallel with each other. The gain element 210 may be shaped as a rectangular parallelepiped.

Diffraction losses, due to clipping of the resonant light 270 in the resonator 202, place a lower limit on the lateral dimensions of the gain element 210. The lateral dimensions refer to the dimensions perpendicular to a lasing path of the resonant light 270, i.e., the width and height of the gain element 210. The smallest lateral dimension should be at least approximately three or four times as large as the beam size, as defined by a 1/e$^2$ beam radius, to make diffraction losses negligible. A typical beam size in the resonator 202 may be in the range of 10 to 100 microns, so the minimum lateral dimension is in the range of 40 to 400 microns. As such, the lateral dimensions of the gain element first surface 211 and second surface 212 may be small, since the beam cross-sectional area is small. While a square face with lateral dimensions of 5 mm×5 mm is mechanically convenient, much smaller lateral dimensions are possible and may be advantageous to reduce cost and improve heat transfer from the gain element 210. For a beam size of 50 microns assuming a lateral dimension four times the beam size, any size larger than approximately 0.2 mm×0.2 mm may be suitable. Thus, the surface area of both the first surface 211 and second surface 212 of the gain element 210 may be as small as approximately 0.2 mm multiplied by 0.2 mm or 0.04 mm$^2$. A larger lateral dimension, such as approximately 0.5 mm or in a in a range between 0.2 mm to 0.5 mm may be appropriate if the beam size is larger or such a thin gain element 210 is mechanically fragile or too difficult to handle. Also, chipping along the edges of the gain element 210 may make a slightly larger lateral dimension more advantageous.

Figure 9:
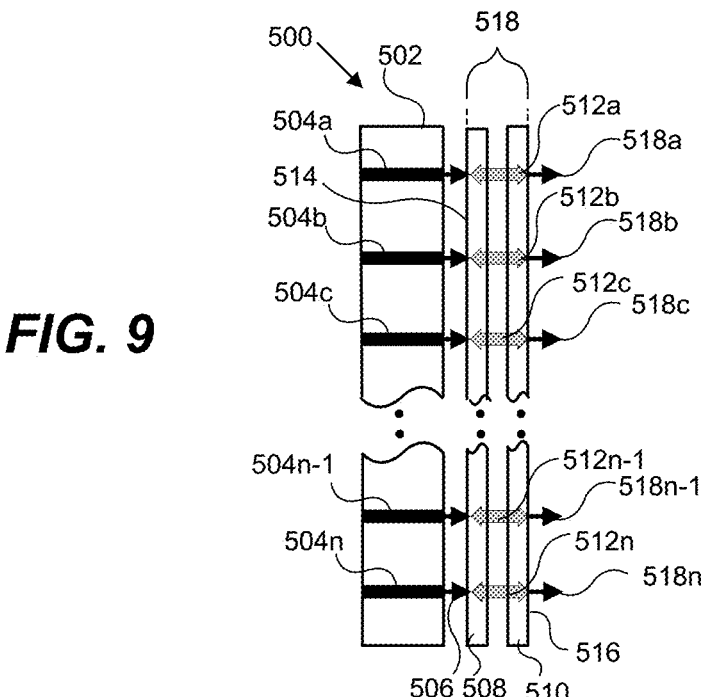
FIG. 9 is a schematic diagram of an eye-safe, passively Q-switched laser system having multiple laser resonators formed by surfaces on a gain element and a saturable absorber element according to an embodiment of the current invention.

The gain element cross-section need not be square, for example, a rectangular cross-section may be used. The smallest lateral dimension of the cross-section may be referred to as a selected lateral dimension. For a square cross-section gain element 210, either the width or height may be denoted as the selected lateral dimension. The cross-section shape may be chosen at least in part to help aid in removal of waste heat from the gain element 210. For example, the height or selected lateral dimension of the gain element 210 may be approximately 0.5 mm or in a range of 0.4 to 0.6 mm, and the width of the gain element may be approximately 2 mm. In other embodiments, the selected lateral dimension may be less than 1 mm or between 0.5 to 1.0 mm. For resonant beams 270 having a small size, such as 25 microns, the selected lateral dimension may be in the range of 0.1 to 0.5 mm. An aspect ratio between the height and width may be optimized for cost and heat transfer from the gain element 210. In some embodiments, particularly those using a plurality of laser emitters each of which may pump a laser resonator as depicted in FIG. 9, the gain element 210 may be required to have larger lateral dimensions.

The saturable absorber element 220 may have lateral dimensions similar to that of the gain element 210.

Another parameter which can be varied to select the desired performance characteristics is small-signal, single-pass absorption of the saturable absorber element 220 in the laser resonator 202. The saturable absorber element 220 may be composed of the vanadium ions in a V:YAG crystal, which acts as a saturable absorber at a wavelength of 1.34 microns. In general, a larger absorption results in a lower repetition rate and shorter pulses. The thickness and doping level of the saturable absorber may be chosen to get a desired saturable absorption of the 1.34 μm lasing light. If the absorption is too low, output pulses will be too long, and their energy and peak power will be low. If the absorption is too high, the system may not achieve threshold, and will not "lase." If it does lase, the pulse repetition rate may be too low, though output pulse length will be short, and pulse energy will be high. For pulse lengths less than 1 ns, a resonator length with a length of less than 1 mm and an absorption of 3% in a single pass may provide acceptable performance. This absorption results in an acceptable trade-off between pulse energy, pulse length, peak power, and repetition rate. This level of absorption may result in a very thin piece of V:YAG, such as a thickness less than 0.5 mm, 0.4 mm, 0.3 mm, 0.2 mm, or 0.1 mm.

The V:YAG crystal may be prepared so that the charge of the vanadium ion is +3, to the highest degree possible, for example, more than 90% of the vanadium ions are in the +3 valance state, also known as the trivalent state. A <100> crystallographic axis of the YAG crystal, of which there are three, may be oriented so that it is substantially perpendicular to the plane of the first surface 221 and second surface 222 of the saturable absorber element 220. The saturable absorber element 220 may be fabricated from a V:YAG crystal. The first surface 231 of the V:YAG crystal may be coated for high transmission at 1.34 μm. A second surface 232 may be coated to function as the laser output coupler, in which case it may be coated for partial transmission at 1.34 μm. A typical partial transmission is 3-25%, that is 3-25% of the incident 1.34 μm light is transmitted and the other 75-97% is reflected.

The first surface 211 and second surface 212 of the gain element 210 may be oriented parallel to the first surface 221 and second surface 222 of the saturable absorber element 220, or they may be oriented at an oblique angle. One of the three, equivalent, <100> crystallographic axes of the V:YAG may be oriented parallel to the "c" axis of the YVO$_4$.

Orientation tolerances may be relatively relaxed, for example, an error of 5° is acceptable.

In alternative embodiments, the spacer 242 need not be located between the gain element 210 and the saturable absorber element 220. The spacer 242 may attach either directly or indirectly to any side of the gain element 210 and the saturable absorber element 220. The spacer 242 may consist of multiple parts that are attached together. Only one of the parts of the spacer 242 need be a piezoelectric material.

A pump power of the pump source 240 will typically less than 8 watts for a semiconductor laser diode pump source having a single emitting aperture. The expected power in the output beam 260 at a wavelength of approximately 1.34 μm will be some percentage of the pump power; for example, 20%. Advantageously the pulsed output power of the laser system 200 may be an order of magnitude or more than that available from the semiconductor laser pump source. The output beam 260 will be polarized, and will be nearly diffraction-limited, with a value of the beam quality figure of merit, $M^2$, of less than or equal to 1.5, where 1 is the ideal limit. A beam with a $M^2$ of less than or equal to 1.5 may be considered a single transverse mode beam. Such a low divergence beam is desirable in laser ranging applications.

Figure 7:
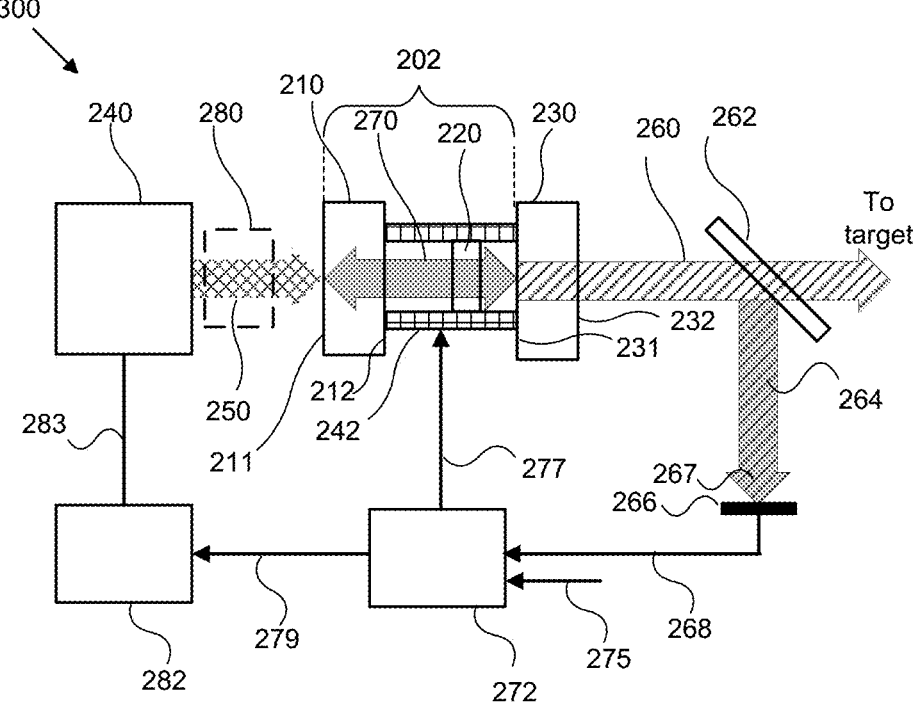
FIG. 7 is a schematic diagram of an eye-safe, passively Q-switched laser system capable of producing very short pulses having an output coupler according to an embodiment of the current invention.

It should be appreciated that a short cavity laser system is not limited to the embodiment depicted in FIG. 5. In other embodiments, an output couple 230 may be included in the resonator 202 of laser system 300 as depicted in FIG. 7. The laser system 300 may be similar to the laser system depicted in FIG. 5 and for brevity a description of some of the common elements will not be repeated here. Unlike previous embodiments, both surfaces of the saturable absorber element 220 may be coated to be anti-reflective at the laser wavelength. The output coupler 230 may have a coating applied to a first surface 231 that transmits some of the resonant light 270 and reflects some of the resonant light 270 back into the resonator 202. Alternatively, the first surface 231 may have a coating that is highly transmissive at the laser wavelength and a partially transmissive coating on the second surface 232. Either or both the first surface 231 and second surface 232 may be planar or curved. As in a previous embodiment, a control signal 277 may be applied to the spacer 242 to change the optical path length in the resonator 202 and thus change the output frequency of the laser system 300. In this embodiment, the gain element 210 may be directly attached to the saturable absorber element 220.

Figure 8:
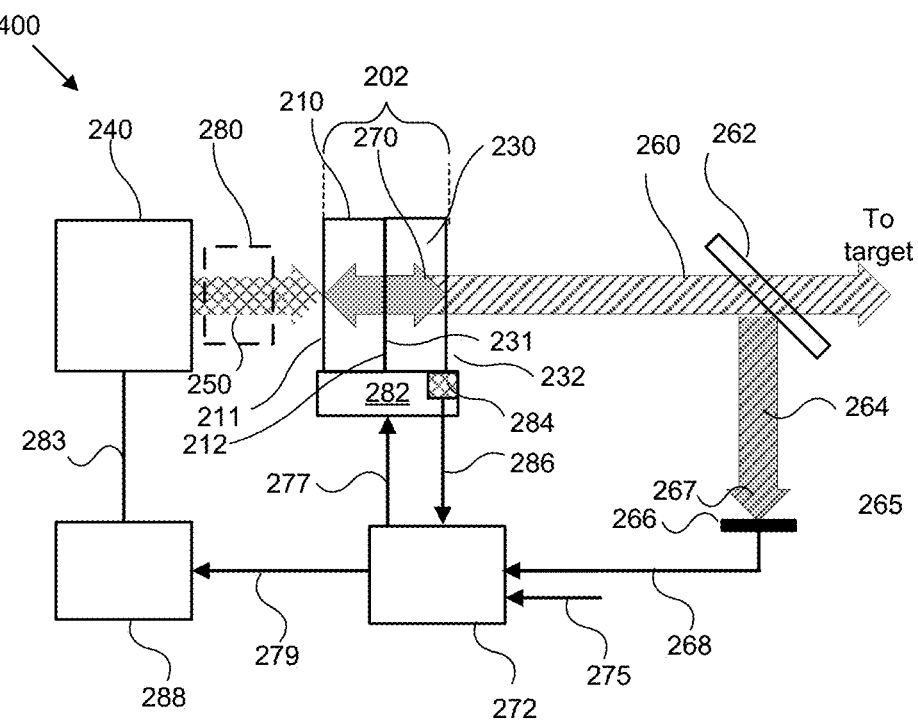
FIG. 8 is a schematic diagram of an eye-safe, passively Q-switched laser system capable of producing very short pulses having a gain element and saturable absorber element situated very close to or contacting each other according to an embodiment of the current invention.

FIG. 8 shows another embodiment of a short pulse laser system 400. The laser system 400 may be similar to the laser system depicted in FIG. 5 and for brevity a description of some of the common elements will not be repeated here. In this embodiment, a gain element 210 and a saturable absorber element 230 are situated very close to each other, for example, separated by less than, 20, or 10 microns or are in contact with each other. The gain element 210 and saturable absorber element 220 may be bonded together directly, through a thin film coating, or by using an adhesive. The adhesive may be within a resonator region occupied by the resonant light 270 or it may be outside of this region. The spacer 242 may be eliminated. The first surface 211 of the gain element 210 and the second surface 222 of the saturable absorber element 220 form the laser resonator 202. The surfaces 211 and 222 may be planar or curved. Surface curvature may be due to mounting stress, coating induced stress, or deformation caused by pumping the resonator 202. Alignment of the laser resonator axial mode spectrum with the gain of the gain element 210 may be achieved by controlling the temperature of the laser resonator 202. For example, the laser resonator 202 may be thermally coupled to a heater 282. The heater 282 may generate heat by dissipating energy in an electrical resistor. The cavity control signal 277 may provide the necessary power to heat the electrical resistor. A temperature sensor 284 may be thermally coupled to the resonator 202 and may provide a feedback signal 286 to the controller 272. Alternatively, the resonator 202 may be thermally coupled to a thermoelectric cooler, which allows the resonator to be either cooled or heated.

Increased Laser System Output Power

The previously described laser systems may be limited in their output power or pulse energy by thermal effects in the resonator or by limits on the available pump power. For example, available pump energies when pumping with a single emitter laser diode may be in the range of 1 to 2 μJ when operating at high pulse repetition rates, such as above 500 kHz. High output laser systems, with pulse energies greater than 2 μJ, may be required for very long-distance ranging, such as distances greater than approximately 1 km. Likewise high pulse repetition rates such as above 300, 400, 500, or 600 kHz may be required so that a point cloud generated by the ranging system may have a sufficient update rate. Thus, the average pulsed output power may need to exceed 1, 1.5, 2, 3 or more Watts for a long-distance ranging system. A pulse energy may be at least approximately 2 μJ and a pulse repetition rate may be at least approximately 500 kHz. Such ranging systems generally do not require high accuracy determination of the distance to the target, such as sub-meter accuracy, and thus short pulses are not required, although they may be useful in some cases. It should be appreciated that the approaches to higher output power described below are not limited to long range LIDAR applications but may be useful in short and mid-range LIDAR systems requiring higher distance accuracy.

There are three basic approaches to increasing the output power and pulse energy of a laser system. In a first approach, multiple laser resonators may operate simultaneously increasing the output power by the number of laser resonators in the laser system. In a second approach, the output a single laser resonator is amplified by passing the output beam through a second gain element outside of the resonator. The second gain element serves as an amplifier increasing the laser system output. In a third approach, the pump power to a single resonator is increased, by spatially combining the output of multiple emitters into a common pump spot in a gain element. Each of these approaches is described below.

The first approach uses a monolithic pump source that has a plurality of laser emitters each of which may pump a laser resonator. Such an architecture is shown in FIG. 9, which shows a laser system 500 having a monolithic pump source 502 having a plurality of individual pump lasers 504a, 504b, 504c, . . . , 504n-1, 504n. The number of individual pump lasers, n, on the monolithic die 502 is equal or greater than two. In some cases, the number of pump lasers may be very large, exceeding 10 or even 100. The monolithic, multiple emitter pump source 502 may be a laser diode bar composed of a plurality of multiple transverse mode or single transverse mode emitters fabricated on a single, monolithic semiconductor die. Alternatively, the multiple emitter pump source 502 may be a 1- or 2-dimensional array of VCSELs fabricated on a single, monolithic semiconductor die.

All the emitting apertures of the monolith pump source 502 may have substantially the same emitting area or the emitting apertures may have different sizes. The monolith pump source 502 may have a single electrical connection. In this case, current supplied by the single electrical connection supplies power to all the individual pump lasers 504a thru 504n and the current through each laser cannot be controlled independent of the current through the other laser. In other embodiments, some or all of the individual pump lasers 504a thru 504n may have an independent electrical connection. In this case, the current through a laser may be controlled independently of the current through other laser sources in the monolith pump source 502.

A pump beam 506 may be emitted by each individual pump lasers 504a thru 504n. The pump beam 506 may be coupled into a gain element 508. The gain element 508 may be fabricated from a doped crystal, such as Nd:YVO$_4$. A saturable absorber element 510 may be situated adjacent the gain element 508. The saturable absorber element 510 may be fabricated from V:YAG. A first side 514 of the gain element 508 and a second side 516 of the saturable absorber element 510 may be coated and aligned as previously described to form a plurality of resonators 512a, 512b, 512c, . . . , 512n-1, 512n. The cavity length 518 of each of the resonators may be substantially similar. Advantageously the plurality of laser resonators 512a thru 512n may be formed by the gain element 508 and the saturable absorber element 510. That is many laser resonators 512a thru 512n may operate simultaneously using only two elements in the laser resonator, the gain element 508 and the saturable element 510. Each gain element 508 and saturable absorber element will have multiple, spatially separated, lasing paths. For example, laser diode bars producing 40 W of cw power or more are commercially available. These bars may have nineteen 150-micron wide emitting apertures arranged on a 500-micron pitch. In this example, the total output power of the laser system 500 may be 19 times that of an individual laser emitter, such as that depicted in FIG. 5. Each laser resonator 512a thru 512n may produce an output beam 518a, 518b, 518c, . . . 518n-1, 518n. The laser resonators 512a thru 512n may be coupled, so that the output beams 518a thru 518n are synchronized in phase, or the output beams 518a thru 518n may be independent. In practice, such a laser system 500 may operate without all laser resonator 512a, 512b, 512c, . . . , 512n-1, 512n functioning, since the loss of a single resonator may have only a small impact on the total output power.

The laser system 500 described above allows multiple passively Q-switched lasers to use only a single, monolithic block of gain material as the gain element 508 and a single, monolithic block of saturable absorber material as the saturable absorber element 510. This architecture is particularly attractive for passively Q-switched laser cavities using planar mirrors on both ends of the laser cavity. In this case, all passively Q-switched laser cavities may be aligned simultaneously. In alternative embodiments, an independent output coupler may be used instead of having the output coupler on the second surface 516 of the saturable absorber element 510. The independent output coupler may be planar or may have a plurality of curved surfaces that forms the second end of the resonator.

Figure 10:
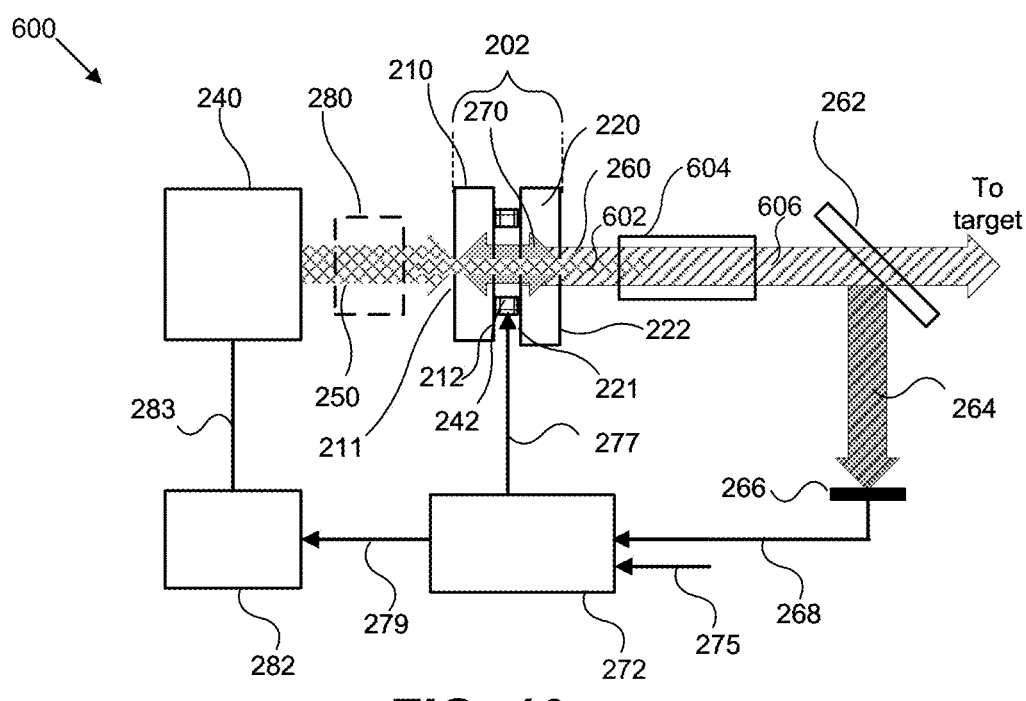
FIG. 10 is a schematic diagram of an eye-safe, passively Q-switched laser system with an amplified output according to an embodiment of the current invention.

The second approach to increase the output power of a laser system is to provide an amplifier to boost the laser system output power. The laser system thus has two gain elements, a first gain element within the resonator and a second gain element in the amplifier outside of the resonator. A particularly advantageous architecture is to use a single pump source to energize both the laser and the amplifier. FIG. 10 shows a schematic diagram of a laser system 600 that amplifies the output of the laser resonator 202. The laser system 600 shown in FIG. 10 uses the laser system 200 depicted in FIG. 5, with the addition of an amplifier 604; however, any of the other previously described laser systems 100, 300, 400, or 500 may be used in place of laser system 200. It may be desirable if the resonator 202 is short, for example, <2 mm to maintain a higher pump intensity in the amplifier 604 without a requirement to refocus the pump beam, although refocusing between the resonator 202 and amplifier 604 may be used in some cases.

The laser system 600 may be arranged so that the gain element 210 absorbs only a portion of the pump beam 250. Thus, a significant percentage of the pump beam 250 passes through the gain element 210. For example, more than 50%, 75%, 90%, 95%, or 99% of the pump beam 250 may pass through the gain element 210. While there may be some absorption of the remaining pump beam in the saturable absorber element 220 a significant amount of the pump beam 250 may pass through the resonator 220 forming a remaining pump beam 602. The remaining pump beam 602 may pump the amplifier 604 causing the amplifier 604 to have gain for the resonator 202 output beam 260. The output beam 260 is thus amplified as it passes through the amplifier 604 producing an amplified beam, which has a higher optical power that can be directed to the target.

In other embodiments, the pump beam 604 that energizes the amplifier 604 does not pass through the resonator 202. This arrangement avoids the pump beam 604 passing through the saturable absorber element 220. Passing the pump beam 604 through the saturable absorber element 220 may result in undesirable heating of the saturable absorber element 220 due to absorption of the pump beam 604.

The amplifier 604 may be fabricated from the same material as the gain element 210, which ensures that both elements have gain at a similar wavelength. In some embodiments, a doping level in the amplifier 604 may be higher than that of the gain element 210. Having different doping levels may be desirable since there is no longer a need to absorb a significant fraction of the pump beam 250 in the gain element 210 to have an efficient laser system. The doping level in the gain element 210 may thus be low.

An advantage of the laser system 600 is that making the gain element 210 thin may result in poor efficiency, since much of the pump beam 250 may not be absorbed. The laser system 600 enables the pump beam 250 not absorbed in the gain element 210 to be utilized and not wasted. The laser system 600 spreads out where waste heat is generated. Waste heat due to the quantum defect and incomplete gain extraction is produced in both the gain element 210 and amplifier 604, compared to having all waste heat produced in the gain element 210. This reduces the thermal load on the gain element 210, which may allow a larger operating window for single axial mode and single transverse mode operation of the resonator 202.

While using a single pump source to pump amplifier 604 through the gain element 210 is advantageous in many applications, this is not a requirement. In alternative embodiments, the pumping beam 250 may be split between the gain element 210 and the amplifier 604 and individually directed into each element. For higher power operation, different pump sources may be used for the gain element 210 and amplifier 604. The output beam 260 may be focused inside the amplifier 604 and the amplifier pump beam 602 may be substantially spatially overlapped.

Figure 11:
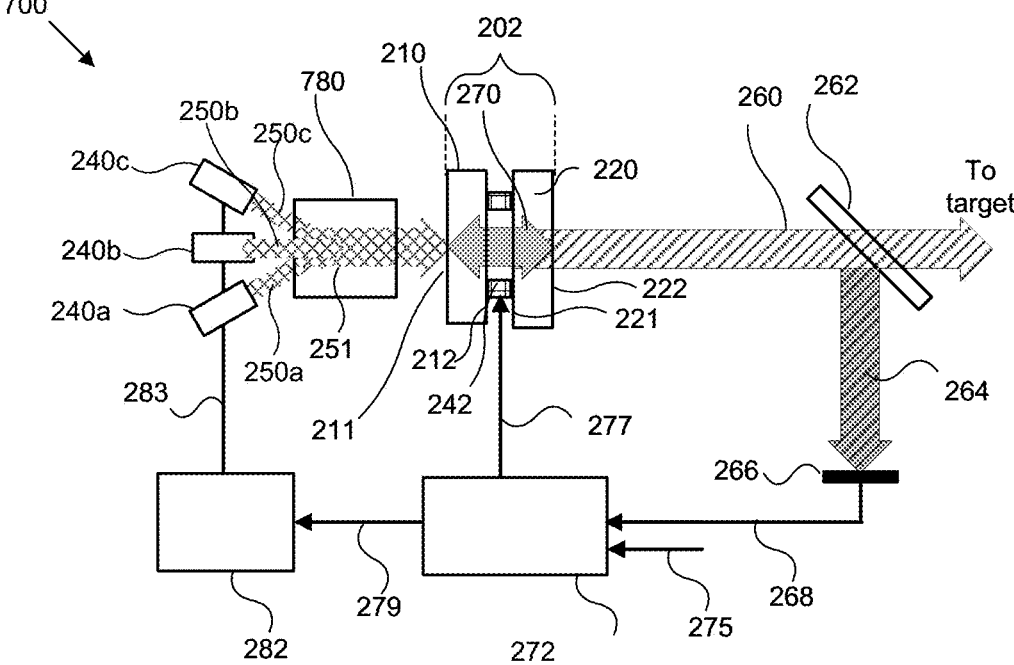
FIG. 11 is a schematic diagram of an eye-safe, passively Q-switched laser system having spatially combined pump beams according to an embodiment of the current invention.

The third approach to increase the output power of a laser system is to spatially combine the output of multiple emitters into a common pump spot in a gain element. FIG. 11 shows a schematic diagram of a laser system 700 having multiple emitters combined into a common pump spot. The laser system 700 may be similar to the laser system depicted in FIG. 5 and for brevity a description of some of the common elements will not be repeated here. Instead of a single pump laser 240 as depicted in FIG. 5 laser system 700 has multiple pump lasers 240_a_, 240_b_, and 240_c_. While three pump lasers are shown in FIG. 11 this number is exemplary only and any number of pump lasers, such as but not limited to, 2, 3, 4, 5 or more, may be used. The individual pump beams 250_a_, 250_b_ and 250_c_ of the pump lasers 240_a_, 240_b_, and 240_c_, respectively, are spatially combined to form a combined pump beam 251. The combined pump beam 251 has power from two or more emitters overlapping in a common pump spot in the gain element 210 of the resonator 202. The spatial combining may occur in the optical element 780 (as depicted in FIG. 11) or it may occur in the gain element 210. For a pump source with an external grating, the external grating may be incorporated into the optical element 780. Spatial combining in the gain element 210 may be realized by orienting the individual pump beams 250_a_, 250_b_ and 250_c_ at a slight angle to each other and overlapping them in the gain element 210. In this arrangement, spatial overlapping of the individual pump beams 250_a_, 250_b_ and 250_c_ occurs primarily in the gain element or adjacent to the gain element and there is little, if any, spatial overlapping of the individual pump beams 250_a_, 250_b_ and 250_c_ in the optical element 780. Thus, the individual pump beams 250_a_, 250_b_ and 250_c_ are spatially distinct in the optical element 780 and only spatially combine in or adjacent to the gain element 210. In other words, the combined pump beam 251 occurs only in or adjacent to the gain element 210. If the spatial combining is done in the optical element 780, the individual pump beams spatially overlap in the optical element 780 and the combined pump beam 251 is directed to the gain element 210. In such an arrangement, the optical element 780 may include an optical fiber that allows the pump lasers 240_a_, 240_b_, and 240_c_, to be situated remotely from the resonator 202. The pump lasers 240_a_, 240_b_, and 240_c_, and optical element 780 may be situated in a common package whose output is fiber delivered to the gain element 210.

The multiple emitters may be situated on a common monolithic semiconductor die such as the monolithic die 502 depicted in FIG. 9. Unlike the arrangement depicted in FIG. 9, the emitters in FIG. 9 are spatially combined to form a common pump spot in the gain element 508. Alternatively, as depicted in FIG. 11, the multiple emitters may be formed from a plurality of discrete semiconductor die that may be individually mounted. The individual emitters in either case may be emitters that emit in a single transverse mode or emitters that emit in multiple transverse modes (often known as wide stripe emitters). If all the emitters are formed on a monolithic die, they will all operate at the same nominal emitting wavelength. If the emitters are discrete, they may emit at different wavelengths, which may facilitate spatially combining the beams using a dichroic mirror which is part of optical element 780. The wavelengths of the different emitters may be chosen to match different absorption peaks in the gain element 210.

If the combined pump beam 251 is delivered to the gain element 210 using an optical fiber, it will generally be unpolarized when it is coupled into the gain element 210, since propagation through a fiber tends to scramble polarization. If the optical element 780 that helps deliver the combined pump beam 251 to the gain element 210 uses only free space optics, such as lenses and mirrors, without use of a fiber, the polarization of the combined pump beam 251 may be preserved through the optical element 780. The combined pump beam 251 incident on the gain element 210 may thus be polarized with a fixed polarization orientation. In other words, each of the pump beams 250_a_, 250_b_ and 250_c_, that form the combined pump beam 251, is incident in a polarized form on a common pump spot on the gain element 210. As used herein, the pump being polarized means that at least 80% of the power in the beam is in a fixed linear polarization. This could be experimentally verified by demonstrating that 80% of the power of the beam can be transmitted through a linear polarizer.

Edge-emitting laser diodes generally have a polarized output. The polarization may be either in the plane of the epitaxial layers of the laser diode or perpendicular to the plane of the epitaxial layers, depending on the details of the epitaxial layers, the laser diode waveguide characteristics, and the mounting of the laser diode die to its heat sink. Preserving the polarized output of an edge-emitting laser diode used as a pump source so that the pump beam incident on the gain element is polarized may be advantageous in as previously described.

A pump beam produced by an edge-emitting laser diode is generally not circularly symmetric. In the fast axis, perpendicular to the plane of the epitaxial layers forming the laser diode, the beam has an $M^2$ close to 1 and diverges very rapidly, since the emission size is very small along this axis, such as approximately 1 micron. In the plane of the epitaxial layers, the divergence is generally lower. Depending on the width of the lasing stripe the $M^2$ value of the pump beam may be near 1 up to 10 or more. Wider stripes, such as 100 to 200 micron stripe widths, generally have larger $M^2$ values indicating poorer beam quality along this axis. When spatially combining pump beams from multiple emitters it may be advantageous to bring the beams together along the fast axis, since this may result in a more symmetric common pump spot.

Advantageously using a polarized pump allows the polarization of the pump beam 250 or combined pump beam 251 to be aligned with a desired crystallographic axis of the gain element. The crystallographic axis may be chosen based on having desirable absorption properties for the pump beam 250 or combined pump beam 251. For example, the c-crystallographic of the Nd:YVO$_4$ has a higher absorption cross-section than other crystallographic axis of Nd:YVO$_4$ so the pump beam 250 or combined pump beam 251 may be polarized so that the is substantially aligned with the c-crystallographic.

The laser systems shown in FIGS. 9-11 may all enable higher output power and higher pulse energy operation than the laser systems shown in FIGS. 4, 6, 7 and 8. These systems may be particularly attractive for ranging systems requiring measurement of distances to remote targets, such as target distances greater than 1, 5, 10, 50, or 100 km. In an alternative method of operation, not all pump lasers 240_a_, 240_b_, and 240_c_ need be operated simultaneously. For example, one or more pump laser may remain off and be held in reserve. In this case, if another pump laser malfunctions the one or more reserve lasers can be activated, and the malfunctioning pump laser deactivated. Such an arrangement may increase the reliability of the laser system 700. Alternatively, all pump lasers 240_a_, 240_b_, and 240_c_ may operate simultaneously and if one pump laser fails, the pump power produced by the still functioning pump lasers may be increased to compensate for the power lost from the failed pump laser.

It should be appreciated that many of the laser system embodiments described above, especially those that couple pump light into the resonator without use of a fiber, may be arranged in a very compact package. A pump source, such as an edge emitting laser diode, will generally have a length less than 3 mm. An optical element, used to couple pump light, from the pump source into the resonator, may have a length as short as several mm or may be several cm in length. As previously described, a resonator may be very short, generally less than 5 mm in length and often significantly less. A beam splitter may be placed immediately adjacent the second end of the resonator, so its length along the path of the pulse output beam can be less than 1 or 2 mm. Thus, a combined length of the laser system including the pump source, optical element, resonator, and beam splitter may be less than 5, 10, 15, 20 or 25 mm, with the exact length dependent on the design details. In some embodiments the optical element and/or beam splitter may be eliminated allowing a smaller overall laser system length. A width and height of the laser system may have similarly small dimensions such as less than 1, 2, 5, or 10 mm. Thus, the volume of a laser system, external of any housing or mounting surfaces, may be less than 5, 10, 25, 50, 100, 200, 500, or 1,000 mm$^3$ depending on the system design. The laser system may be enclosed in a housing having an output window and input electrical leads. Alternatively, the laser system may not have a separate enclosure. Advantageously, many of the laser systems described herein may be much more compact than competing laser systems that use a pulsed seed laser with a fiber amplifier to produce a series of eye-safe laser pulses for use in a laser ranging system.

Figure 12:
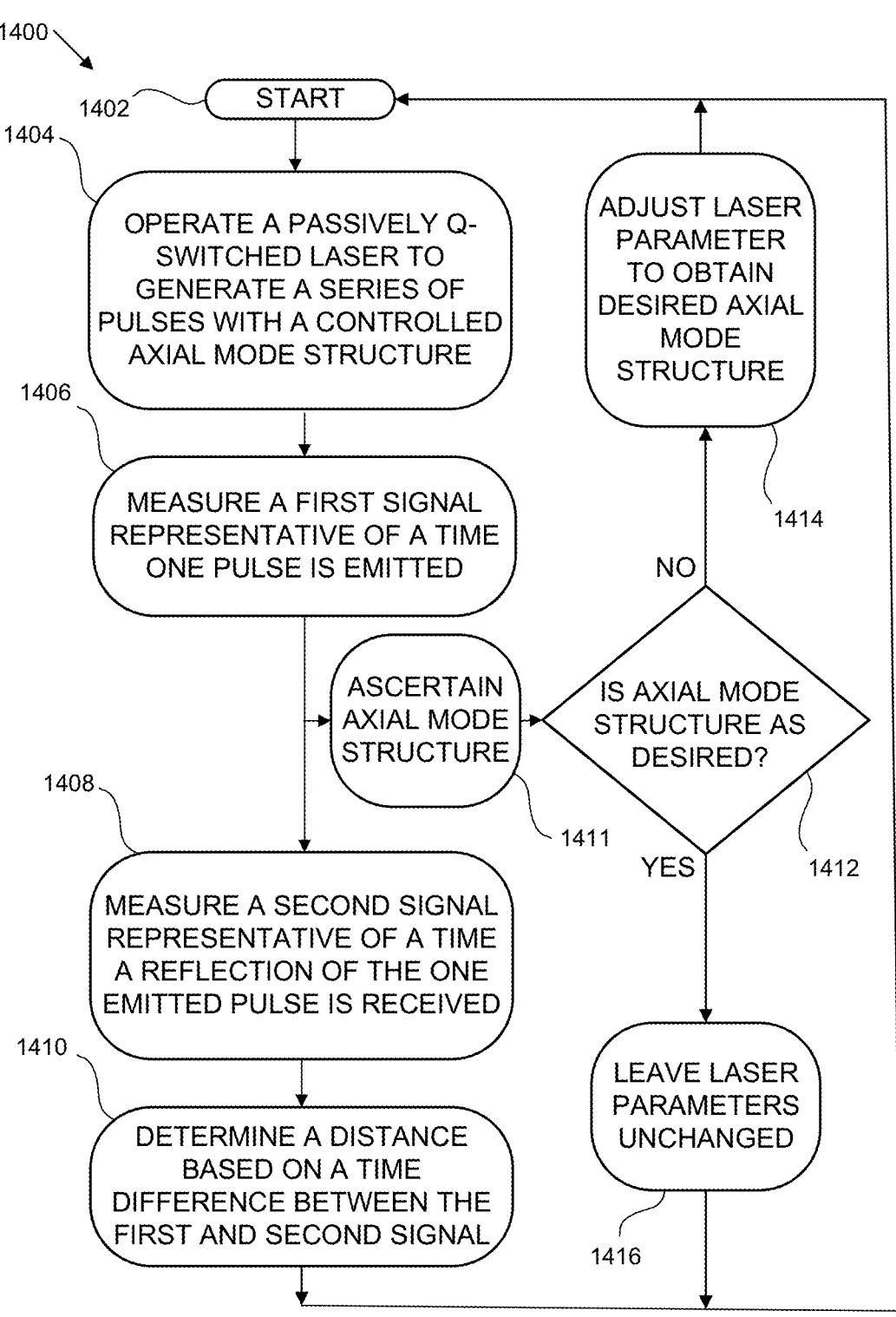
FIG. 12 is a flowchart depicting a method of measuring a distance according to an embodiment of the current invention.

FIG. 12 shows a flow chart 1400 that depicts a method of determining a distance according to an embodiment of the current invention. The flow chart 1400 starts at step 1402. At step 1404 a passively Q-switched laser is operated to generate a series of pulses. The controlled axial mode structure may be either single axial mode, two axial mode, or multi axial mode. At step 1406 a first signal is measured, which is representative of a time one pulse in the series of pulses is emitted. In addition to the time the one pulse was emitted, the measurement may optionally include a pulse energy and/or pulse duration of the one emitted pulse. The flow chart 1400 may fork into two paths after completion of step 1406. One fork proceeds to step 1408 in which a second signal representative of a time a reflection of the one emitted pulse is received. At step 1410 a distance may be determined based on a time difference between the first and second signal. The path then returns to the start 1402. The other path following step 1406 proceeds to step 1411. At step 1411 the axial mode structure of the one pulse is ascertained. The axial mode structure may be ascertained by monitoring the laser parameters of one or more pulses emitted prior to the one pulse. These laser parameters can include the time interval between pulses, the pulse energy, and the pulse duration. The path then proceeds to step 1412 in which a determination is made whether the axial mode structure is the desired axial mode structure. If the axial mode structure is the desired axial mode structure, the path proceeds to step 1416 in which laser parameters are left unchanged. The path then returns to start 1402. If the axial mode structure is not the desired axial mode structure, the path proceeds to step 1414 in which the laser parameters are adjusted to achieve the desired axial mode structure. The laser parameters that may be adjusted in step 1414 include the pump power and/or the resonator length. The path then again returns to start 1402. The method of determining a distance depicted in flowchart 1400 may be repeated for each pulse in a series of pulses emitted by the passively Q-switched laser.

The method depicted in flowchart 1400 uses measurement of some parameter of the laser output, such as, time interval between successive pulses, pulse energy of successive pulses, or pulse duration of successive laser pulses, to infer an axial mode structure of the laser output. This measurement may be used as part of a feedback loop to adjust the axial mode structure to a desired state.

In an alternative embodiment, the flow chart 1400 may be simplified if control of the axial mode structure is not desired. In this embodiment, steps 1411, 1412, 1414, and 1416 may be eliminated.

In summary, the present application discloses in one embodiment a laser system configured to output a laser beam having a wavelength between 1.2 and 1.4 microns. The laser system may be comprised of a gain element having a first and a second surface, the first surface having a highly reflective coating at the lasing wavelength between 1.2 and 1.4 microns to form a first end of a resonator and a saturable absorber element. A second end of the resonator may be formed by a second surface having a partially transmitting optical coating at the lasing wavelength between 1.2 and 1.4 microns. The laser system may be energized by a pump source having a pump beam directed to the first surface of the gain element; wherein the pump source has a wavelength in the range of 875 to 890 nm. In an embodiment, the laser system may have a single transverse mode pump beam. In another embodiment, the pump source is an edge-emitting laser diode, and an output wavelength of the laser diode is locked by a grating. The grating may be internal to the laser diode or may be situated external to the laser diode.

In another embodiment, the present application discloses a laser system configured to output a laser beam having a wavelength between 1.2 and 1.4 microns. The laser system includes a gain element having a first and a second surface, the first surface having a highly reflective coating at the lasing wavelength between 1.2 and 1.4 microns to form a first end of a resonator and a saturable absorber element. A second end of the resonator may be formed by a second surface having a partially transmitting optical coating at the lasing wavelength between 1.2 and 1.4 microns. The laser system is energized by a pump source having a pump beam directed to the first surface of the gain element, wherein the pump beam is characterized by having a single transverse mode. In an embodiment, the pump beam may have wavelength within a wavelength range between 875 to 890 nm.

In another embodiment, the present application discloses a laser system configured to output a laser beam having a wavelength between 1.2 and 1.4 microns having a gain element having a first and a second surface. The first surface has a highly reflective coating at the lasing wavelength between 1.2 and 1.4 microns to form a first end of a resonator. The laser system further includes a saturable absorber element. A second end of the resonator formed by a second surface having a partially transmitting optical coating at the lasing wavelength between 1.2 and 1.4 microns, The laser system is energized by a pump source that generates a pump beam directed to the first surface of the gain element. The pump source may be a vertical-cavity, surface-emitting laser or an edge-emitting laser.

In another embodiment, the present application discloses a laser system configured to output a laser beam having a wavelength between 1.2 and 1.4 microns. The laser system includes a gain element having a first and a second surface, the first surface having a highly reflective coating at the lasing wavelength between 1.2 and 1.4 microns to form a first end of a resonator and a saturable absorber element having a first surface and a second surface. A second end of the resonator is formed by the second surface of the saturable absorber having a partially transmitting optical coating at the lasing wavelength between 1.2 and 1.4 microns. The laser system is energized by a pump source that generates a pump beam directed to the first surface of the gain element. The laser emits a series of pulses having a pulse width less than 1 nanosecond. In some embodiments, the second surface of the gain element and the first surface of the saturable absorber are separated by less than 20 microns or the second surface of the gain element and the first surface of the saturable absorber contact each other. The laser system may be pumped by a pump beam characterized by having a single transverse mode. The resonator may have a length of less than 1 or 0.5 mm.

In another embodiment, the present application discloses a laser system configured to output a plurality of laser beams having a wavelength between 1.2 and 1.4 microns having a gain element having a first and a second surface, the first surface having a highly reflective coating at the lasing wavelength between 1.2 and 1.4 microns to form a first end of a resonator and a saturable absorber element. A second end of the resonator formed by a second surface having a partially transmitting optical coating at the lasing wavelength between 1.2 and 1.4 microns. The laser system is energized by a multiple emitter pump source having a plurality of emitters on a monolithic semiconductor die. In some embodiments, emission from each of the plurality of emitters on the monolithic die is directed to the first surface of the gain element. The gain element and the saturable absorber element may each be comprised of a single, monolithic block.

In another embodiment, the present application discloses a laser system configured to output a plurality of laser beams having a wavelength between 1.2 and 1.4 microns having a gain element having a first and a second surface, the first surface having a highly reflective coating at the lasing wavelength between 1.2 and 1.4 microns to form a first end of a resonator and a saturable absorber element. A second end of the resonator formed by a second surface having a partially transmitting optical coating at the lasing wavelength between 1.2 and 1.4 microns. The laser system further includes an amplifier, and a pump source. The pump source generates a pump beam directed to the first surface of the gain element. A portion of the pump beam is transmitted by the gain element and pumps the amplifier. In some embodiments, the gain element and amplifier are fabricated from the same material and a doping level in the amplifier is higher than a doping level in the gain element.

In another embodiment, the present application discloses a laser system configured to output a plurality of laser beams having a wavelength between 1.2 and 1.4 microns having a gain element having a first and a second surface, the first surface having a highly reflective coating at the lasing wavelength between 1.2 and 1.4 microns to form a first end of a resonator and a saturable absorber element. A second end of the resonator formed by a second surface having a partially transmitting optical coating at the lasing wavelength between 1.2 and 1.4 microns. The laser system further includes a multiple emitter pump source having a plurality of emitters that are spatially combined to pump a common pump spot on the gain element.

In any of the previously described embodiments, the resonator may contain a second gain element to assist in distributing heat generated by absorption of the pump beam. The doping level of the two gain elements may be different. Advantageously the doping level of the first gain element forming the first end of the resonator, where the pump beam initially enters that resonator, may be lower than that of the second gain element, which experiences a lower level of pump power due to absorption of some of the pump beam in the first gain element. Such an arrangement tends to more evenly distribute generation of waste heat along the pump beam path.

Any of the previously described laser systems, may be incorporated as part of a laser ranging system the laser system and a detector.

In another embodiment, a method of determining a distance between a platform and a target is described. The method comprises mounting any of the previously described lasers or laser systems on or in the platform. Operating the laser or laser system in a series of pulses, each pulse in the series of pulses having a wavelength between 1.2 and 1.4 microns. Measuring a first signal representative of a time one pulse in the series of pulses is emitted from the laser or laser system. Measuring a second signal representative of a time a reflection off the target of the one pulse in the series of pulses is received by a detector mounted on the platform. Determining a distance between the platform and the target based on a time difference between the first signal and the second signal. In some embodiments, a rise time of each pulse in the series of pulses is less than 500 ps.

The laser system has been described as operating in a wavelength range between 1.2 to 1.4 microns; however, the invention is not so limited. The laser system may operate in other in other wavelength ranges, such as between 0.9-1.2 microns and 1.4-2.0 microns. In particular, the laser system may operate in an eye-safe wavelength range with wavelengths greater than 1.2 microns. The gain element host material need not be $YVO_4$ but can be any suitable crystalline or glass material. Likewise, the dopant need not by neodymium (Nd), but can be any suitable dopant such as erbium (Er), holmium (Ho), ytterbium (Yb), praseodymium (Pr), thulium (Tm), dysprosium (Dy) or any other suitable rare-earth element. In particular, erbium doped gain elements may operate in a wavelength range between 1.5 to 1.6 microns.

Similarly, the saturable absorber element has been described as a V:YAG crystal, but the saturable absorber element may take other forms. For example, the saturable absorber element may be a semiconductor material with a series of epitaxially grown layers forming a saturable absorber structure. Alternatively, it may be a different dopant in a different host with absorption properties suitable for operation at the lasing wavelength.

Although only a few embodiments of the invention have been described in detail, it should be appreciated that the invention may be implemented in many other forms without departing from the spirit or scope of the invention. The invention has been described primarily as a laser ranging system for a vehicle; however, the ranging system may be used in other platforms. The ranging system may be used in other moving platforms, such as a locomotive, ship, airplane, or unmanned drone. It may also be used in stationary applications, such as to determine the shape and layout of a structure, such as a building, bridge, or industrial facility, or to observe moving vehicles from a fixed location, such as a traffic intersection or airport taxiway. The resonator has been described as having only a single gain element; however, the resonator may contain multiple gain elements. Such a structure may be helpful is dissipating waste heat. One end of the resonator has been described as being located on a first surface of the gain element; however, in alternative embodiments, both surfaces of the gain element may be anti-reflection coated at the laser wavelength and a separate cavity element may form an end of the resonator. Alternatively, the gain element may have an undoped cap, an outer surface of which forms an end of the resonator. Therefore, the present embodiments should be considered illustrative and not restrictive, and the invention is not to be limited to the details given herein.

What is claimed is:

1. A laser system configured to output a pulsed laser beam having a wavelength between 1.2 and 1.4 microns comprising:

a first gain element having a first and a second surface, the first surface having a highly reflective coating at the lasing wavelength to form a first end of a resonator;

a second gain element within the resonator;

a second end of the resonator formed by a second surface having a partially transmitting optical coating at the lasing wavelength between 1.2 and 1.4 microns; and a saturable absorber element located in the resonator, the saturable absorber being configured to output the pulsed laser beam, wherein the pulsed output laser beam has an average power greater than 1 Watt.

2. The laser system as recited in claim 1, wherein the pulsed output laser beam has a pulse energy of at least approximately 2 µJ and a pulse repetition rate of at least approximately 500 kHz.

3. The laser system as recited in claim 1, wherein the partially transmitting optical coating at the lasing wavelength between 1.2 and 1.4 microns is on a surface of the saturable absorber.

4. The laser system as recited in claim 1, further comprising a multiple emitter pump source having a plurality of emitters, wherein the multiple emitter pump source is composed of multiple discrete emitters.

5. The laser system as recited in claim 4, further comprising a pump laser driver, wherein the multiple emitters of the pump source are arranged in series such that a current flowing through each emitter of the multiple emitter pump source is the same.

6. A laser ranging system comprising:

the laser system as recited in claim 1; and a detector, wherein the laser ranging system measures distances to a target located more than 1 km from the laser ranging system.

7. A laser system configured to output a pulsed laser beam having a wavelength between 1.2 and 1.4 microns comprising:

a first gain element having a first and a second surface, the first surface having a highly reflective coating at the lasing wavelength between 1.2 and 1.4 microns to form a first end of a resonator;

a second gain element within the resonator;

a second end of the resonator formed by a second surface having a partially transmitting optical coating at the lasing wavelength between 1.2 and 1.4 microns;

a saturable absorber element located in the resonator, the saturable absorber being configured to output the pulsed laser beam; and a multiple emitter pump source configured to generate a plurality of pump beams that spatially overlap in a common pump spot in the gain elements to form a combined pump beam by bringing the plurality of pump beams together along their fast axes, wherein the combined pump beam occurs only in or adjacent to the gain elements and the multiple emitter pump source is composed of multiple discrete emitters.

8. A laser system configured to output a pulsed laser beam having a wavelength between 1.2 and 1.4 microns comprising:

a first gain element having a first and a second surface, the first surface having a highly reflective coating at the lasing wavelength between 1.2 and 1.4 microns to form a first end of a resonator;

a second gain element within the resonator;

a second end of the resonator formed by a second surface having a partially transmitting optical coating at the lasing wavelength between 1.2 and 1.4 microns;

a saturable absorber element located in the resonator, the saturable absorber being configured to output the pulsed laser beam; and a multiple emitter pump source having a plurality of edge-emitting laser diodes each configured to emit an associated polarized pump beam that is incident in polarized form on a common pump spot in the gain element, wherein at least a selected one of the edge-emitting laser diodes in the multiple emitter pump source operates in a wavelength range between 875 nm to 890 nm and is grating-locked to wavelength-narrow and -stabilize the associated pump beam generated by the selected emitter and wherein the multiple edge-emitting laser diodes of the pump source are arranged in series such that a current flowing through each laser diode of the plurality of laser diodes is the same.

9. The laser system as recited in claim 1, wherein the first gain element has a lower doping level than the second gain element.

10. The laser system as recited in claim 1, wherein the partially transmitting optical coating at the lasing wavelength between 1.2 and 1.4 microns is on a discrete output coupler.

11. A laser ranging system as recited in claim 4, wherein each of the multiple emitters is configured to emit an associated polarized pump beam that is incident in polarized form on a common pump spot in the gain element by bringing the plurality of pump beams together along their fast axes.

12. The laser system as recited in claim 8, wherein the first gain element has a lower doping level than the second gain element.

13. The laser system as recited in claim 7, further comprising a pump laser driver, wherein the multiple emitters of the pump source are arranged in series such that a current flowing through each emitter of the multiple emitter pump source is the same.

14. The laser system as recited in claim 7, wherein the plurality of pump beams are directly delivered to the gain elements without the use of optical fiber.

15. The laser system as recited in claim 7, wherein the first gain element has a lower doping level than the second gain element.

* * * * *